(12) United States Patent
Fayyad et al.

(10) Patent No.: US 6,374,251 B1
(45) Date of Patent: Apr. 16, 2002

(54) SCALABLE SYSTEM FOR CLUSTERING OF LARGE DATABASES

(75) Inventors: Usama Fayyad, Mercer Island, WA (US); Paul S. Bradley, Madison, WI (US); Cory Reina, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/040,219

(22) Filed: Mar. 17, 1998

(51) Int. Cl.$^7$ .............................................. G06F 17/00

(52) U.S. Cl. ...................... 707/101; 707/101; 345/772; 706/11

(58) Field of Search ................................ 707/102, 101, 707/1, 5; 345/772, 764, 859; 706/11

(56) References Cited

U.S. PATENT DOCUMENTS

| | | | |
|---|---|---|---|
| 5,706,503 A | 1/1998 | Poppen et al. | |
| 5,832,182 A | 11/1998 | Zhang et al. | |
| 5,884,305 A | 3/1999 | Kleinberg et al. | |

OTHER PUBLICATIONS

J. Banfield and A. Raftery, "Model–based Gaussian and Non–Gaussian Clustering", Biometrics, vol. 49: 803–821, pp. 15–34, 1993.

R. Brachman, T. Khabaza, W. Kloesgen, G. Piatetsky–Shapiro, and E. Simoudis, "Industrial Applications of Data Mining and Knowledge Discovery." Communications of ACM 39(11). 1996.

P.S. Bradley, O.L. Managasarian, and W.N. Street. 1997. "Clustering via Concave Minimization", in Advances in Neural Information Processing Systems, 9, M.C. Mozer, M.I. Jordan, and T. Petsche (Eds.) pp. 368–374, MIT Press, 1997.

P. Cheeseman and J. Stutz, "Bayesian Classification (Auto-Class): Theory and Results", in Advances in Knowledge Discovery and Data Mining, Fayyad, U., G. Piatetsky–Shapiro, P. Smyth, and R. Uthurusamy (Eds.) pp. 153–180. MIT Press, 1996.

A.P. Dempster, N.M. Laird, and D.B. Rubin, "Maximum Likelihood from Incomplete Data via the EM Algorithm". Journal of the Royal Statistical Society, Series B, 39(1): 1–38, 1977.

(List continued on next page.)

Primary Examiner—Thomas Black
Assistant Examiner—Uyen Le
(74) Attorney, Agent, or Firm—Watts, Hoffmann, Fisher & Heinke, Co., L.P.A.

(57) ABSTRACT

A data mining system for use in finding clusters of data items in a database or any other data storage medium. The clusters are used in categorizing the data in the database into K different clusters within each of M models. An initial set of estimates (or guesses) of the parameters of each model to be explored (e.g. centriods in K-means), of each cluster are provided from some source. Then a portion of the data in the database is read from a storage medium and brought into a rapid access memory buffer whose size is determined by the user or operating system depending on available memory resources. Data contained in the data buffer is used to update the original guesses at the parameters of the model in each of the K clusters over all M models. Some of the data belonging to a cluster is summarized or compressed and stored as a reduced form of the data representing sufficient statistics of the data. More data is accessed from the database and the models are updated. An updated set of parameters for the clusters is determined from the summarized data (sufficient statistics) and the newly acquired data. Stopping criteria are evaluated to determine if further data should be accessed from the database. If further data is needed to characterize the clusters, more data is gathered from the database and used in combination with already compressed data until the stopping criteria has been met.

20 Claims, 12 Drawing Sheets-

OTHER PUBLICATIONS

M. Ester, H. Kreigel, X. Xu, "A Database Interface for Clustering in Large Spatial Databases", Proc. First International Conference on Knowledge Discovery and Data Mining KDD–95 AAAI Press, 1995.

U. Fayyad, D. Haussler, and P. Stolorz. "Mining Science Data". Communications of the ACM 39(11), 1996.

U. Fayyad, S.G. Djorgovski and N. Weir, "Application of Classification and Clustering to Sky Survey Cataloging and Analysis", Computing Science and Statistics, vol. 29(2), E. Wegman and S. Azen (Eds.), pp. 178–186, Fairfax, VA: Interface Foundation of North America, 1997.

D. fisher, "Knowledge Acquisition via Incremental Conceptual Clustering". Machine Learning, 2:139–172, 1987.

E. Forgy, "Cluster Analysis of Multivariate Data: Efficiency vs. Interpretablility of Classifications", biometrics 21:768. 1965.

C. Glymour, D. Madigan, D. Pregibon, and P. Smyth. 1997. "Statistical Themes and Lessons for Data Mining", Data Mining and Knowledge Discovery, vol. 1, No. 1.

Jones, "A Note on Sampling From a Tape File", Communications of the ACM, vol. 5, 1962. p. 343.

M.R. Anderberg, "Cluster Analysis For Applications" pp. 162–163, Academic Press, New York. 1973.

M. Meila and D. Heckerman, 1998. "An Experimental Comparison of Several Clustering Methods", Microsoft Research Technical Report MSR–TR–98–06, Redmond, WA.

R. NG and J. Han, "Efficient and Effective Clustering Methods for Spatial Mining", Proc. of VLDB–94, 1994.

D. Pregibon and J. Elder, "A Statistical Perspective on Knowledge Discovery in Databases", in Advances in Knowledge Discovery and Data Mining, Fayyad, U., G. Piatetsky–Shapiro, P. Smyth, and R. Uthurusamy (Eds.) pp. 83–116. MIT Press, 1996.

S.Z. Selim and M.A. Ismail, "K–Means–Type Algorithms: A. Generalized Convergence Theorem and Characterization of Local Optimality." IEEE Trans. on pattern Analysis and Machine Intelligence, vol. PAMI–6, No. 1, 1984.

T. Zhang, R. Ramakrishnan, and M. Livny. "BIRCH: A New Data Clustering Algorithm and Its Applications." Data Mining and Knowledge Discovery 1(2). 1997.

C. M. Bishop. "Neural Networks for Pattern Recognition-".Bayes Theorem. Clarendon Press.Oxford pp. 17–23 (1995).

C.M. Bishop. "Neural Networks For Pattern Recognition." The Normal Distribution. Clarendon Press.Oxford. pp. 34–38 (1995).

C.M. Bishop. "Neural Networks For Pattern Recognition." Maximum Likihood, Clarendon Press. Oxford pp. 39–42 (1995).

C.M. Bishop. "Neural Networks For Pattern Recognition." Density Estimation in General. Clarendon Press. Oxford.

C. M. Bishop. "Neural Networks for Pattern Recognition." Mixture Models/Maximum Likelihood/EM Algorithm. Clarendon Press.Oxford pp. 59–72 (1995).

R. Duda and P. Hart, "Pattern Classification and Scene Analysis," *Bayes Decision Theory*. John Wiley & Sons pp. 10–13 (1973).

R. Duda and P. Hart. "Pattern Classification and Scene Analysis." *The Normal Density*. John Wiley & Sons. pp. 22–24 (1973).

R. Duda and P. Hart. "Pattern Classification and Scene Analysis." *Maximum Likelihood Estimation*: John Wiley & Sons pp. 45–49 (1973).

R. Duda and P. Hart. "Pattern Classifcation nd Scene Analysis." *Sufficient Statistics and The Exponential Family*. pp. 62–66 John Wiley & Sons (1973).

R. Duda and P. Hart. "Pattern Classification and Scene Analysis." *Density Estimation*. John Wiley & Sons Chap. 4, pp. 85–88 (1973).

R. Duda and P. Hart. "Pattern Classification and Scene Analysis." *Unsupervised Learning and Clustering*. John Wiley & Sons. Chap. 6 pp. 189–200 (1973).

R. Duda and P. Hart. "Pattern Classification and Scene Analysis." *Clustering Criteria (K–Mean)*: John Wiley & Sons Chap. 6 pp. 217–219 (1973).

R. Duda and P. Hart. "Pattern Classificationa nd Scene Analysis." *Iterative Optimization*. (relates to K–Mean/EM) John Wiley & Sons Chap. 6 pp. 225–228 (1973).

K. Fukunaga. "Statistical Pattern Recognition". *Bayes Theorem Academic Press Chap. 1* pp. 12–13 (1990).

K. Fukanaga. "Statistical Pattern Recognition," *Normal Distributions*. Academic Press. Chap. 2 pp. 16–24 (1990).

K. Fukanaga. "Statistical Pattern Recognition." *Clustering* Academic Press. Chap. 11 pp. 508–512 (1990).

R. Duda and P. Hart. "Pattern Classification and Scene Analysis." *Nearest Mean Reclassification Algorithm (k–Mean)*; Chap. 11 pp. 515–523. Academic Press. (1990).

K. Fukunaga. "Statistical Pattern Recognition". *Maximum Likelihood*. Academic Press Chap. 11 pp. 527–532 (1990).

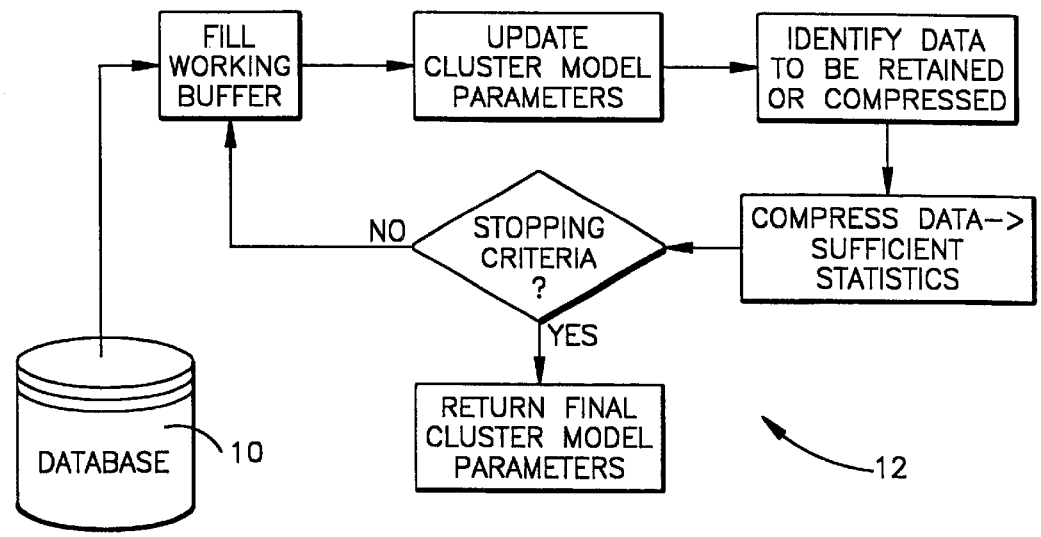
Fig.3A
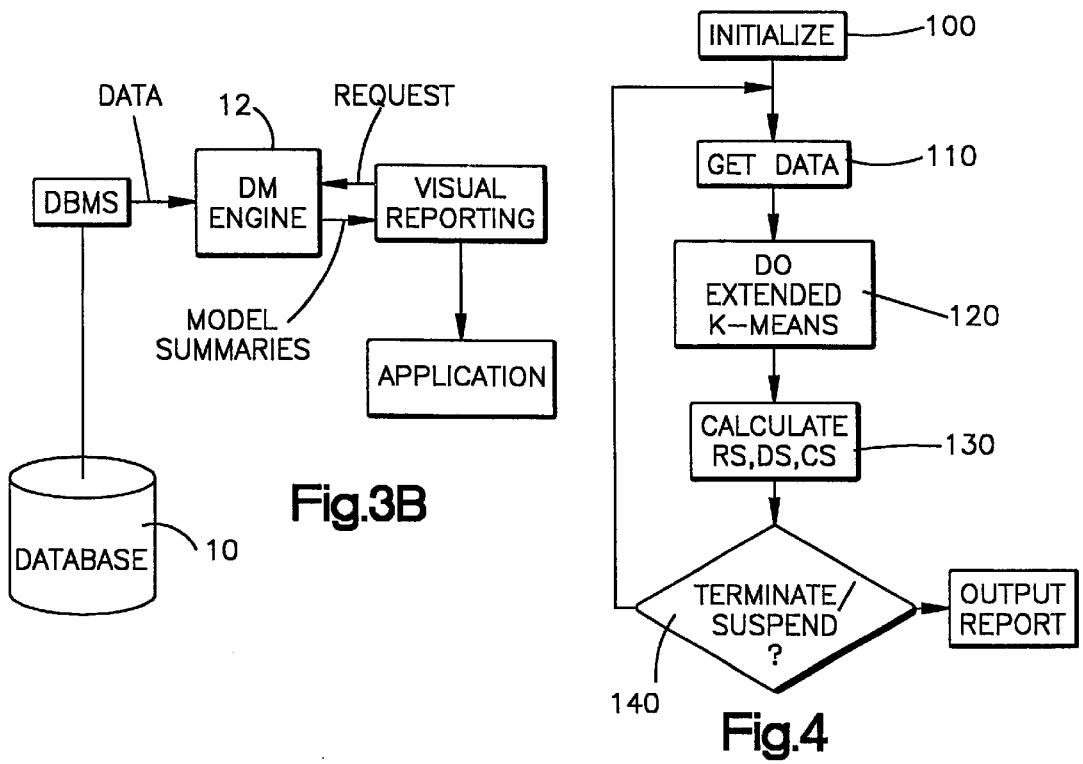
Fig.3B
Fig.4

EXTENDED K-MEANS PROCEDURE

SCALABLE SYSTEM FOR CLUSTERING OF LARGE DATABASES

FIELD OF THE INVENTION

The present invention concerns database analysis and more particularly concerns an apparatus and method for clustering of data into groups that capture important regularities and characteristics of the data.

BACKGROUND ART

Large data sets are now commonly used in most business organizations. In fact, so much data has been gathered that asking even a simple question about the data has become a challenge. The modern information revolution is creating huge data stores which, instead of offering increased productivity and new opportunities, are threatening to drown the users in a flood of information. Tapping into large databases for even simple browsing can result in an explosion of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Clustering has been studied for decades in statistics, pattern recognition, machine learning, and many other fields of science and engineering. However, implementations and applications have historically been limited to small data sets with a small number of dimensions.

Each cluster includes records that are more similar to members of the same cluster than they are similar to rest of the data. For example, in a marketing application, a company may want to decide who to target for an ad campaign based on historical data about a set of customers and how they responded to previous campaigns. Other examples of such problems include: fraud detection, credit approval, diagnosis of system problems, diagnosis of manufacturing problems, recognition of event signatures, etc. Employing analysts (statisticians) to build cluster models is expensive, and often not effective for large problems (large data sets with large numbers of fields). Even trained scientists can fail in the quest for reliable clusters when the problem is high-dimensional (i.e. the data has many fields, say more than 20).

Clustering is a necessary step in the mining of large databases as it represents a means for finding segments of the data that need to be modeled separately. This is an especially important consideration for large databases where a global model of the entire data typically makes no sense as data represents multiple populations that need to be modeled separately. Random sampling cannot help in deciding what the clusters are. Finally, clustering is an essential step if one needs to perform density estimation over the database (i.e. model the probability distribution governing the data source). Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

Clustering is an important area of application for a variety of fields including data mining, statistical data analysis, compression, and vector quantization. Clustering has been formulated in various ways. The fundamental clustering problem is that of grouping together (clustering) data items that are similar to each other. The most general approach to clustering is to view it as a density estimation problem. We assume that in addition to the observed variables for each data item, there is a hidden, unobserved variable indicating the "cluster membership" of the given data item. Hence the data is assumed to arrive from a mixture model and the mixing labels (cluster identifiers) are hidden. In general, a mixture model M having K clusters Ci, i=1, ..., K, assigns a probability to a data point x as follows:

$$\Pr(x|M) = \sum_{i=1}^{K} W_i \cdot \Pr(x|Ci, M)$$

where $W_i$ are called the mixture weights. The problem then is estimating the parameters of the individual Ci. Usually it is assumed that the number of clusters K is known and the problem is to find the best parameterization of each cluster model. A popular technique for estimating the model parameters (including cluster parameters and mixture weights) is the EM algorithm (see P. Cheeseman and J. Stutz, "Bayesian Classification (AutoClass): Theory and Results", in in Advances in Knowledge Discovery and Data Mining, Fayyad, U., G. Piatetsky-Shapiro, P. Smyth, and R. Uthurusamy( Eds.), pp. 153–180. MIT Press, 1996; and A. P. Dempster, N. M. Laird, and D. B. Rubin, "Maximum Likelihood from Incomplete Data via the EM algorithm". Journal of the Royal statistical Society, Series B, 39(1): 1–38, 1977). There are various approaches to solving the optimization problem of determining (locally) optimal values of the parameters given the data. The iterative refinement approaches are the most effective. The basic algorithm goes as follows:

1. Initialize the model parameters, producing a current model.
2. Decide memberships of the data items to clusters, assuming that the current model is correct.
3. Re-estimate the parameters of the current model assuming that the data memberships obtained in 2 are correct, producing new model.
4. If current model and new model are sufficiently close to each other, terminate, else go to 2.

The most popular clustering algorithms in the pattern recognition and statistics literature belong to the above iterative refinement family: the K-Means algorithm J. MacQueen, "Some methods for classification and analysis of multivariate observations. In *Proceedings of the Fifth Berkeley Symposium on Mathematical Statistics and Probability*. Volume I, Statistics, L. M. Le Cam and J. Neyman (Eds.). University of California Press, 1967. There are many variants of these that iteratively refine a model by rescanning the data many times. These algorithms have found many applications recently, including in industry and science. The difference between the EM and K-Means is the membership decision (step 2). In K-Means, a data item belongs to a single cluster, while in EM each data item is assumed to belong to every cluster but with a different probability. This of course affects the update step (3) of the algorithm. In K-Means each cluster is updated based strictly on its membership. In EM each cluster is updated by the entire data set according to the relative probability of membership.

SUMMARY OF THE INVENTION

The invention represents a methodology for scaling clustering algorithms to large databases. The invention enables effective and accurate clustering in one or less scans of a database. Use of the invention results in significantly better performance than prior art schemes that are based on random sampling. These results are achieved with significantly less memory requirement and acceptable accuracy in terms of approaching the true solution than if one had run the clustering algorithm on the entire database.

Known methods can only address small databases (ones that fit in memory) or resort to sampling only a fraction of the data. The disclosed invention is based on the concept of retaining in memory only the data points that need to be present in memory. The majority of the data points are summarized into a condensed representation that represents their sufficient statistics. By analyzing a mixture of sufficient statistics and actual data points, significantly better clustering results than random sampling methods are achieved and with similar lower memory requirements. The invention can typically terminate well before scanning all the data in the database, hence gaining a major advantage over other scalable clustering methods that require at a minimum a full data scan.

The invention concerns a framework that supports a wide class of clustering algorithms. The K-means algorithm as an example clustering algorithm that represents one specific embodiment of this framework. The framework is intended to support a variety of algorithms that can be characterized by iteratively scanning data and updating models. We use K-Means since it is well-known and established clustering method originally known as Forgy's method and has been used extensively in pattern recognition. It is a standard technique for clustering, used in a wide array of applications and even as way to initialize the more expensive EM clustering algorithm.

When working over a large data store, one needs to pay particular attention to certain issues of data access. A clustering session may take days or weeks, and it is often desirable to update existing models as data arrives. A list of desirable data mining characteristics follows: The invention satisfies all these:

1. Clustering should run within one scan (or less) of the database if possible: a single data scan is considered costly, early termination if appropriate is highly desirable.
2. On-line "anytime" behavior: a "best" answer is always available from the system, with status information on progress, expected remaining time, etc.
3. Suspendable, stoppable, resumable; incremental progress saved to resuming a stopped job.
4. An ability to incrementally incorporate additional data with existing models efficiently.
5. Should work within confines of a given limited RAM buffer.
6. Utilize variety of possible scan modes: sequential, index, and sampling scans if available.
7. Should have the ability to operate with forward-only cursor over a view of the database. This is necessary since the database view may be a result of an expensive join query, over a potentially distributed data warehouse, with much processing required to construct each row (case).

The technique embodied in the invention relies on the observation that clustering techniques do not need to rescan all the data items as it is originally defined and as implemented in popular literature and statistical libraries and analysis packages. The disclosed process may be viewed as an intelligent sampling scheme that employs some theoretically justified criteria for deciding which data can be summarized and represented by a significantly compressed set of sufficient statistics, and which data items must be carried in computer memory, and hence occupying a valuable resource. On any given iteration of the invention, we partition the existing data samples intro three subsets: A discard set (DS), a compression set (CS), and a retained set (RS). For the first two sets, we discard the data but keep representative sufficient statistics that summarize the subsets. The last, RS, set is kept in memory. The DS is summarized in a single set of sufficient statistics. The compression set CS is summarized by multiple sufficient statistics representing subclusters of the CS data set.

The invention operates by obaining a next available (possibly random) sample from a database to fill free space in buffer. A current model of the clustering is then updated over the contents of the buffer. Elements of the new sample are identified to determine whether they need to be retained in the buffer (retained set RS); they can be discarded with updates to the sufficient statistics (discard set DS); or they can be reduced via compression and summarized as sufficient statistics (compression set CS). Once this has been done a determination is made to see if a stopping criteria is satisfied. If so terminate clustering, if not then sample more data.

The exemplary embodiment satisfies the abovementioned important issues faced during data mining. A clustering session on a large database can take days or even weeks. It is often desirable to update the clustering models as the data arrives and is stored. It is important in this data mining environment to be able to cluster in one scan (or less) of the database. A single scan is considered costly and clustering termination before one complete scan is highly desirable.

An exemplary embodiment of the invention includes a model optimizer. A multiple number of different clustering models are simultaneously generated in one or less scans of the database. The clustering analysis stops when one of the models reaches a stopping criteria. Alternately, the clustering can continue until all of the multiple models are complete as judged by the stopping criteria.

These and other objects, advantages and features of the invention will be better understood from a detailed description of an exemplary embodiment of the invention which is described in conjunction with the accompanying drawings.

BRIEF DESCRIPTION OF THE DRAWINGS

FIGS. 3A and 3B are schematic depictions showing software components of the invention;

FIG. 4 is a flow diagram of an exemplary embodiment of the invention;

DETAILED DESCRIPTION OF EXEMPLARY EMBODIMENT OF THE INVENTION

A large database 10 for which the present invention has particular utility contains many records stored on multiple, possibly distributed storage devices. Each record has many attributes or fields which for a representative database might include age, income, number of children, number of cars owned etc. A goal of the invention is to characterize clusters of data in the database 10. This task is straightforward for small databases (all data fits in the memory of a computer for example) having records that have a small number of fields or attributes. The task becomes very difficult, however, for large databases having huge numbers of records with a high dimension of attributes.

Overview of Scalable Clustering

FIG. 4 is a flow chart of the process steps performed during a scalable clustering analysis of data in accordance with the present invention. An initialization step 100 includes a step of initializing a number of data structures shown in FIGS. 6A–6D and choosing a cluster number K for characterizing the data.

Figure 1:
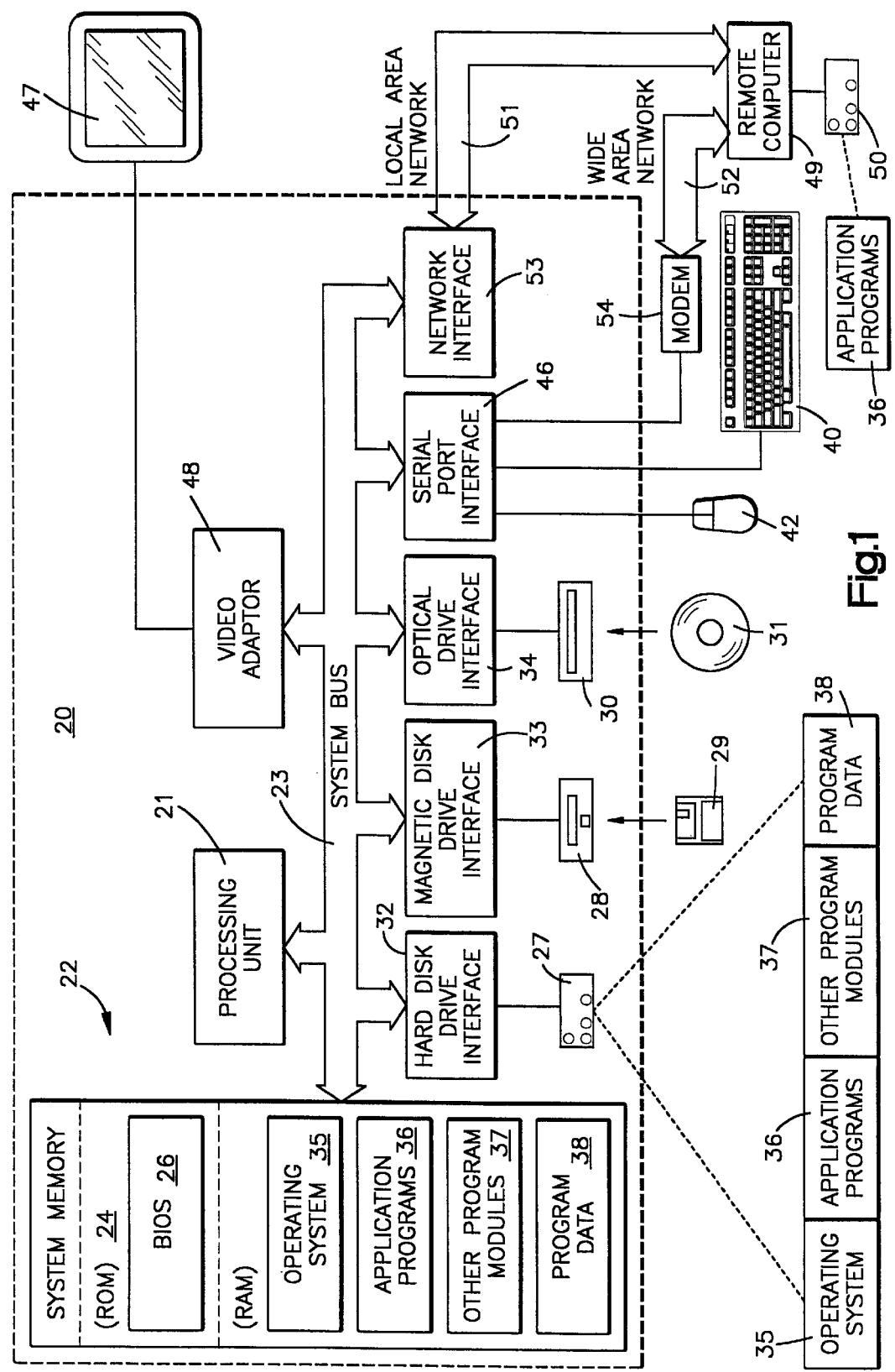
FIG. 1 is a schematic illustration of a computer system for use in practicing the present invention.

A next step 110 is to sample a portion of the data in the database 10 from a storage medium to bring that portion of data within a random access memory (into RAM for example, although other forms of random access memory are contemplated) of the computer 20 shown in FIG. 1. In general, the data has a large number of fields so that instead of a single dimension analysis, the invention characterizes a large number of vectors where the dimension of the vector is the number of attributes of the data records in the database. The data structure 180 for this data is shown in FIG. 6C to include a number r of records having a potentially large number of attributes.

The gathering of data can be performed in either a sequential scan that uses only a forward pointer to sequentially traverse the data or an indexed scan that provides a random sampling of data from the database. When using the index scan it is a requirement that data not be accessed multiple times. This can be accomplished by marking data tuples to avoid duplicates, or a random index generator that does not repeat. In particular, it is most preferable that the first iteration of sampling data be done randomly. If it is known the data is random within the database then sequential scanning is acceptable. If it is not known that the data is randomly distributed, then random sampling is needed to avoid an inaccurate representative of the database.

Returning to FIG. 4, a processor unit 21 of the computer 20 next executes 120 a clustering procedure using the data brought into memory in the step 110 as well as compressed data in the CS and DS data structures. In accordance with an exemplary clustering process described in greater detail below, the processor 21 assigns data contained within the portion of data brought into memory to a cluster and determines a set of parameters for each attribute of the data assigned to a given cluster. A data structure for the results or output model of the analysis is a model of the clustering of data and is depicted in FIG. 6D. This model includes K records, one for each cluster. In an exemplary embodiment (for supporting the K-means clustering algorithm) which assumes that the attributes of the database are independent of each other, each record has three required components: 1) a vector 'Sum' representing the sum for each of the attributes or dimensions of the vector data records in a given cluster, 2) a vector 'Sumsq' representing the sum of the attributes squared and 3) an integer 'M' counting the number of data records contained in or belonging to the corresponding cluster. These are sufficient to compute the mean (center) and covariance (spread) of the data in a cluster. Note that these structures are maintained in the case of K-means because these are the set of model parameters that characterize K-means clustering. In general, these data structures need to hold the parameters describing the best model. In case of discrete data, these structures would hold parameters of the multinomial distribution, or some other distribution on discrete data. In case of EM with mixture of Gaussians, these structures would hold the means and covariance matrices of the clusters. Note that although FIGS. 6(A–D) shows SUM and SUMSQ structures, some of these structures change depending on the clustering algorithm being used. In case of EM, the SUMSQ vector (array) may be replaces with a matrix holding covariances of data in the cluster. The parameters represented in the structures enable the model to assign a probability of membership for every data item in every cluster. Our scalable framework needs this probability to determine data item membership in DS, CS, and RS sets (discussed later), as part of its data compression stage.

A next step 130 in the FIG. 4 flowchart summarizes at least some of the data used in the present iteration to characterize the K clusters. This summarization is contained in the data structures DS, CS of FIGS. 6A and 6B. The summarization takes up significantly less storage in a computer memory 25 than the vector data structure (FIG. 6D) needed to store individual records. Storing a summarization of the data in the data structures of FIGS. 6A and 6B frees up more memory allowing additional data to be sampled from the database 10.

Before looping back to get more data the processor 21 determines 140 whether a stopping criteria has been reached. One stopping criteria that is used is whether the analysis has produced a good enough model (FIG. 6D) by a standard that is described below. A second stopping criteria has been reached if all the data in the database 10 has been used in the analysis.

One important aspect of the invention is the fact that instead of stopping the analysis, the analysis can be suspended. Data in the data structures of FIGS. 6A–6D can be saved (either in memory or to disk) and the scalable clustering analysis can then be resumed later. This allows the database to be updated and the analysis resumed to update the clustering statistics without starting from the beginning. It also allows another process to take control of the processor 21 without losing the state of the clustering analysis. The suspension could also be initiated in response to a user request that the analysis be suspended by means of a user actuated control on an interface presented to the user on a monitor 47 while the Clustering analysis is being performed.

FIGS. 3A and 3B depict an operating environment of the invention. Tjis is shown also in NEWFIG. Data in the database 10 is accessed through a database management system that sends data to a data mining engine 12. The data mining engine 12 processes requests from an application 14 and responds by sending back model summaries to the application. The software components of the data mining engine 12 are depicted in more detail in FIG. 3A.

K-Means Clustering

There is a large literature of known data clustering techniques. One known technique is the so called K-means clustering process which is summarized in Duda-Hart (Pattern Classification and Scene Analysis) 1973 John Wiley & Sons, Inc., New York. An exemplary embodiment of the present scalable clustering analysis is described by reference to the K-Means Clustering process.

Figure 9:
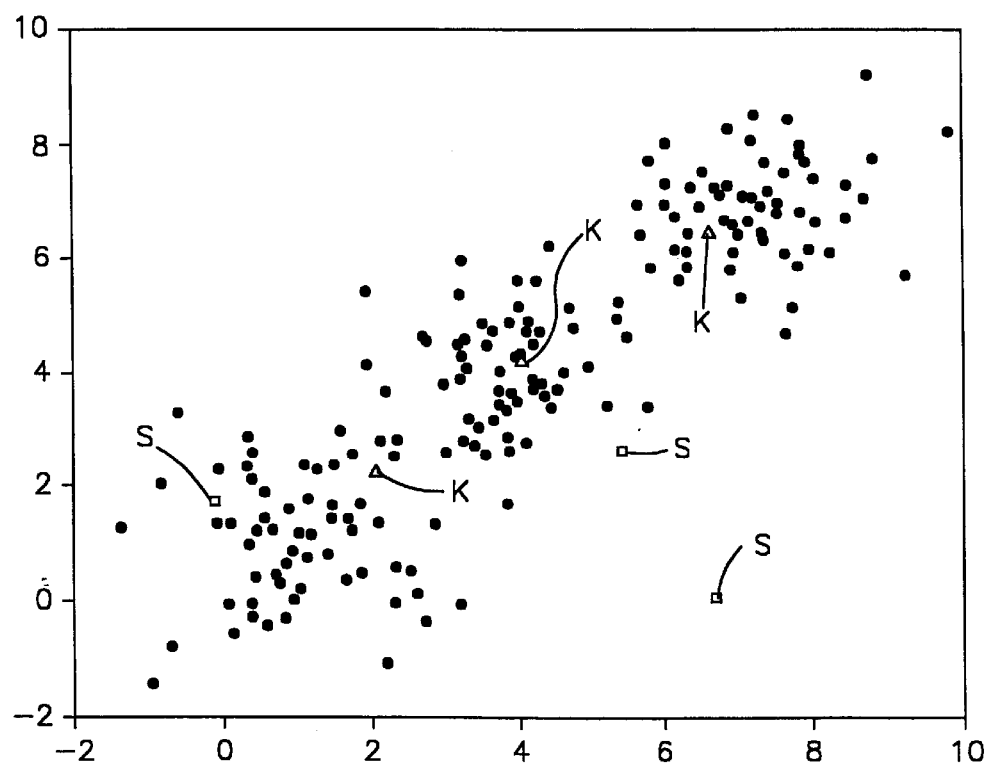
FIG. 9 is a plot of data points in two dimensions showing a clustering of data.
Figure 10:
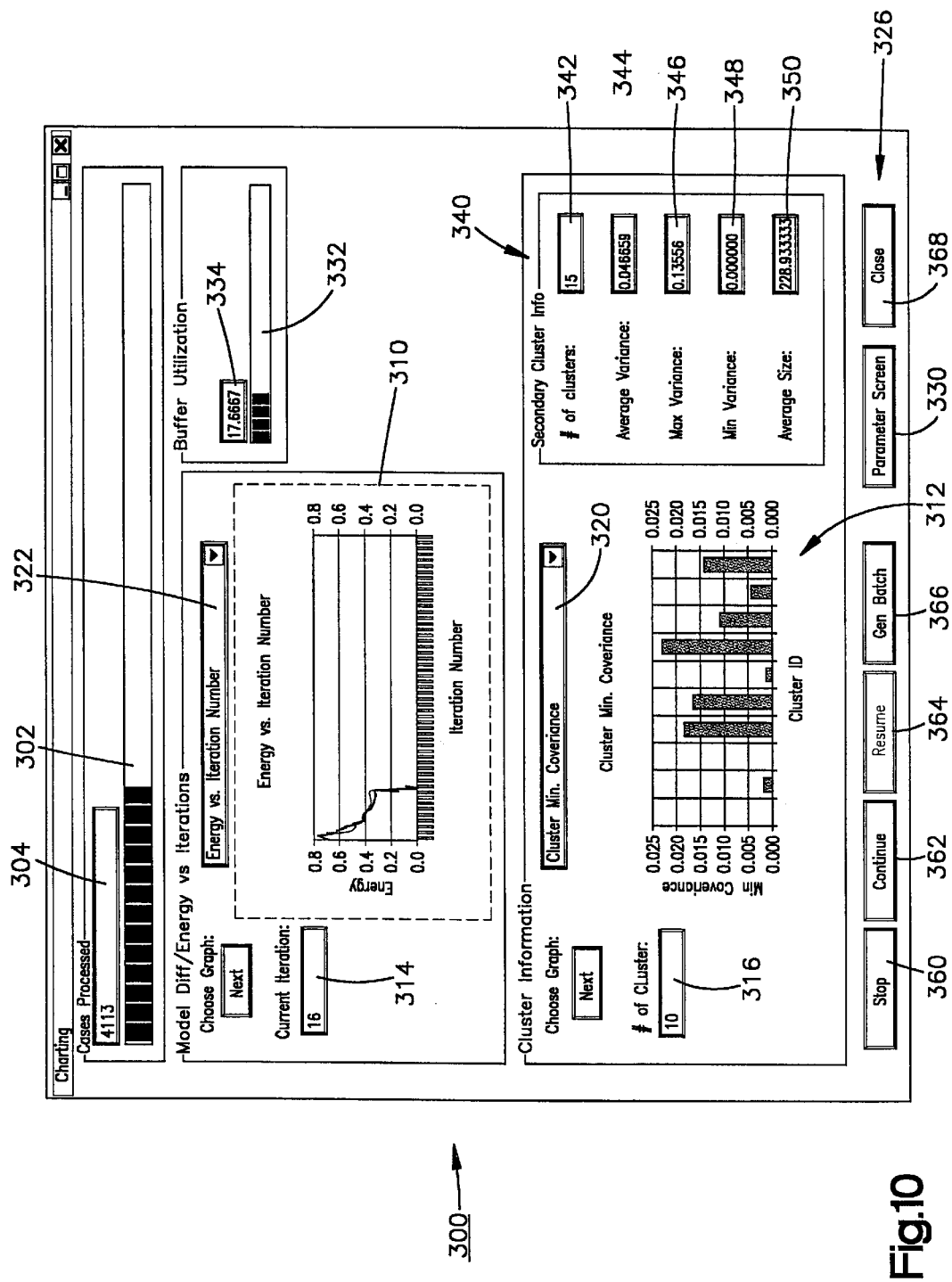
FIGS. 10–14 are user interface screens indicating various aspects of the clustering process.
Figure 11:
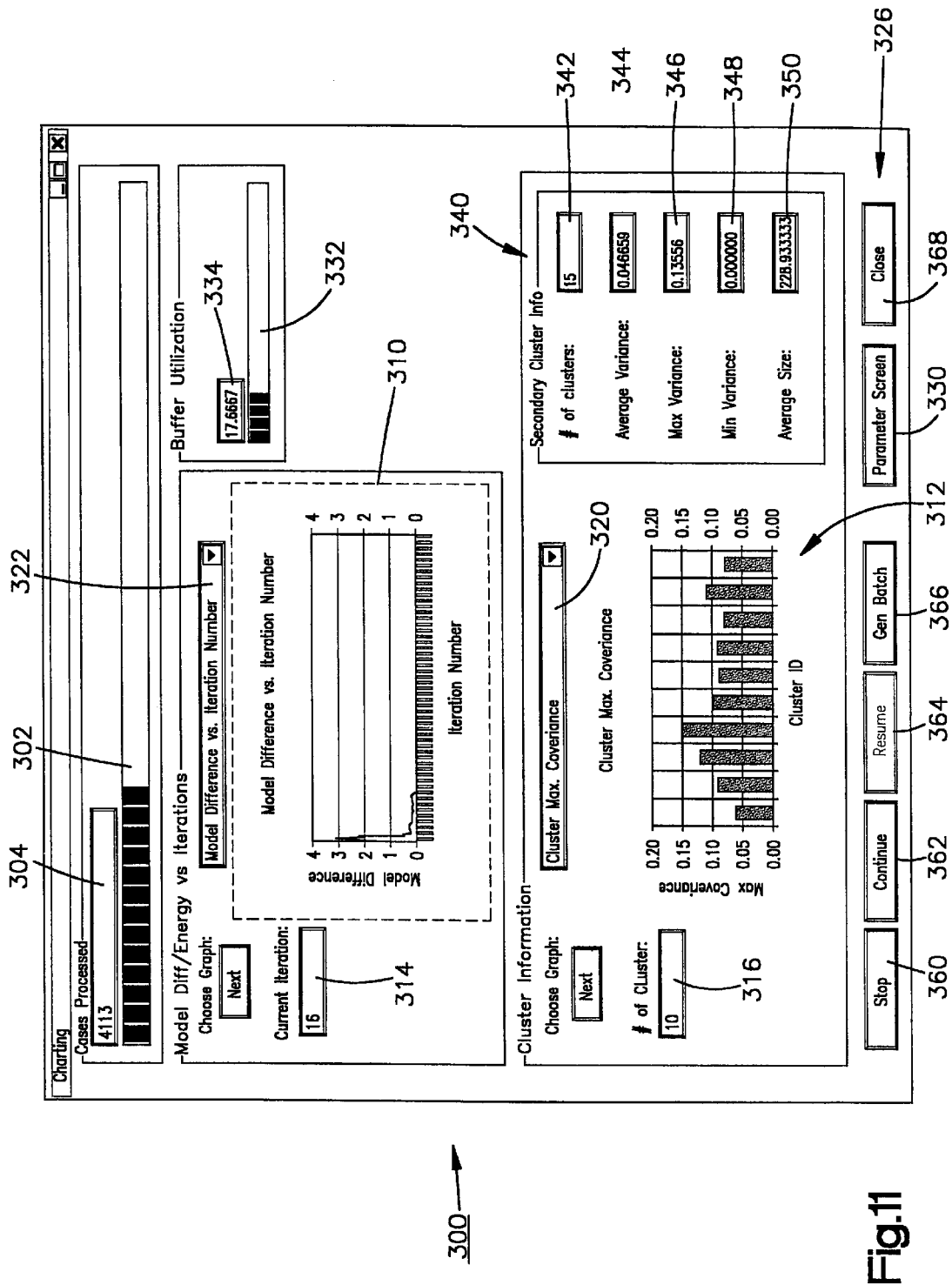
Figure 12:
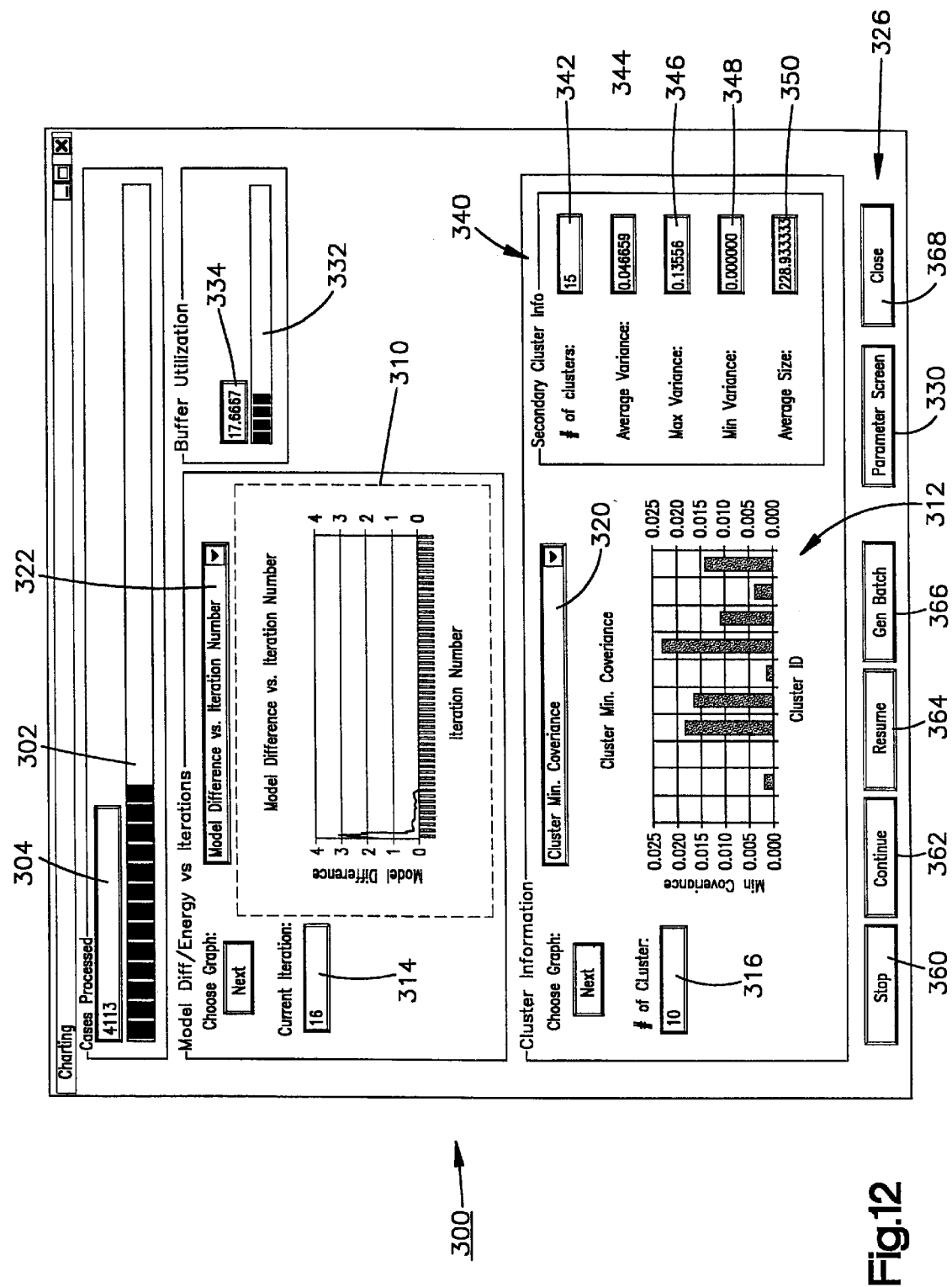
Figure 13:
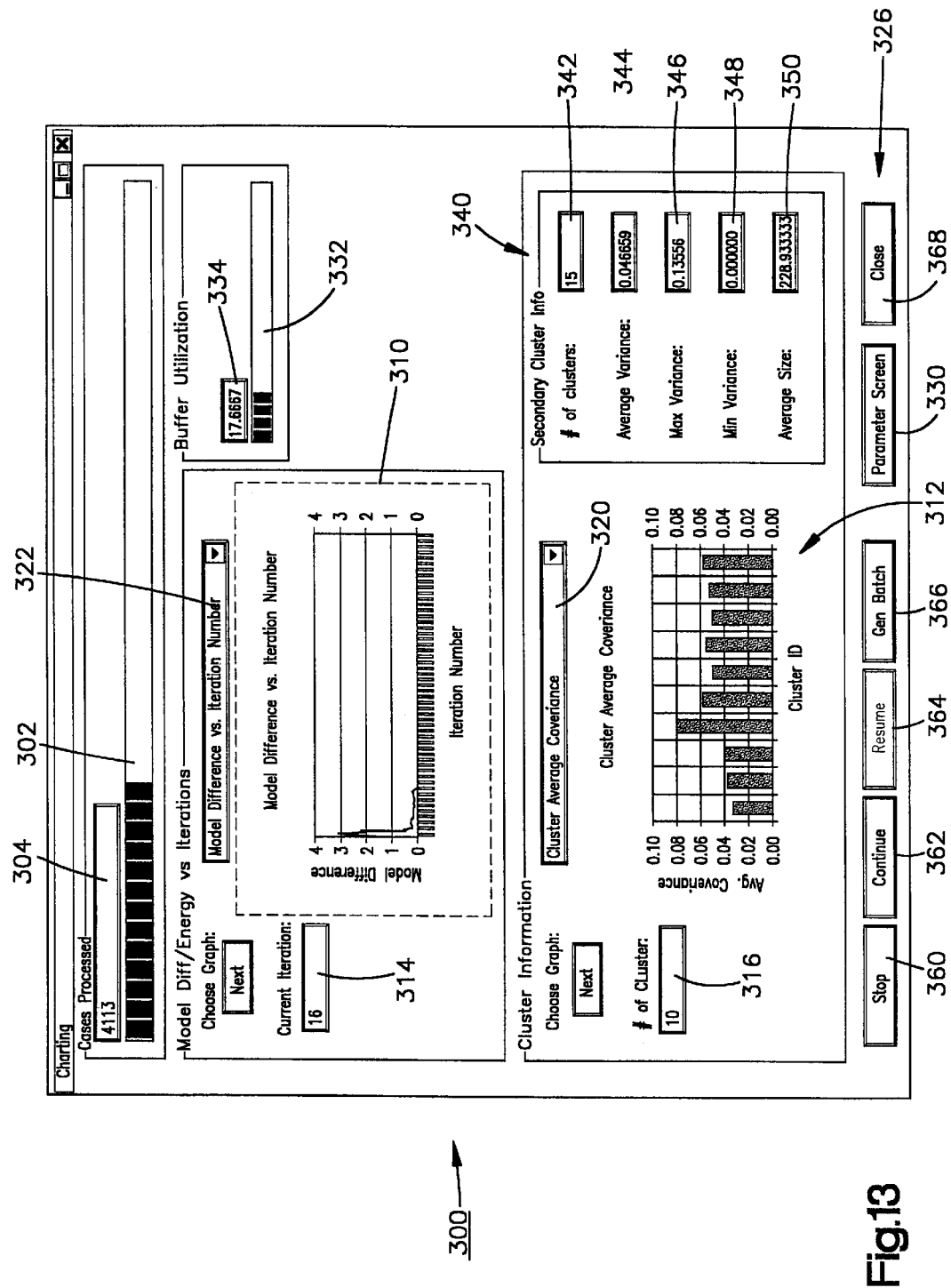
Figure 14:
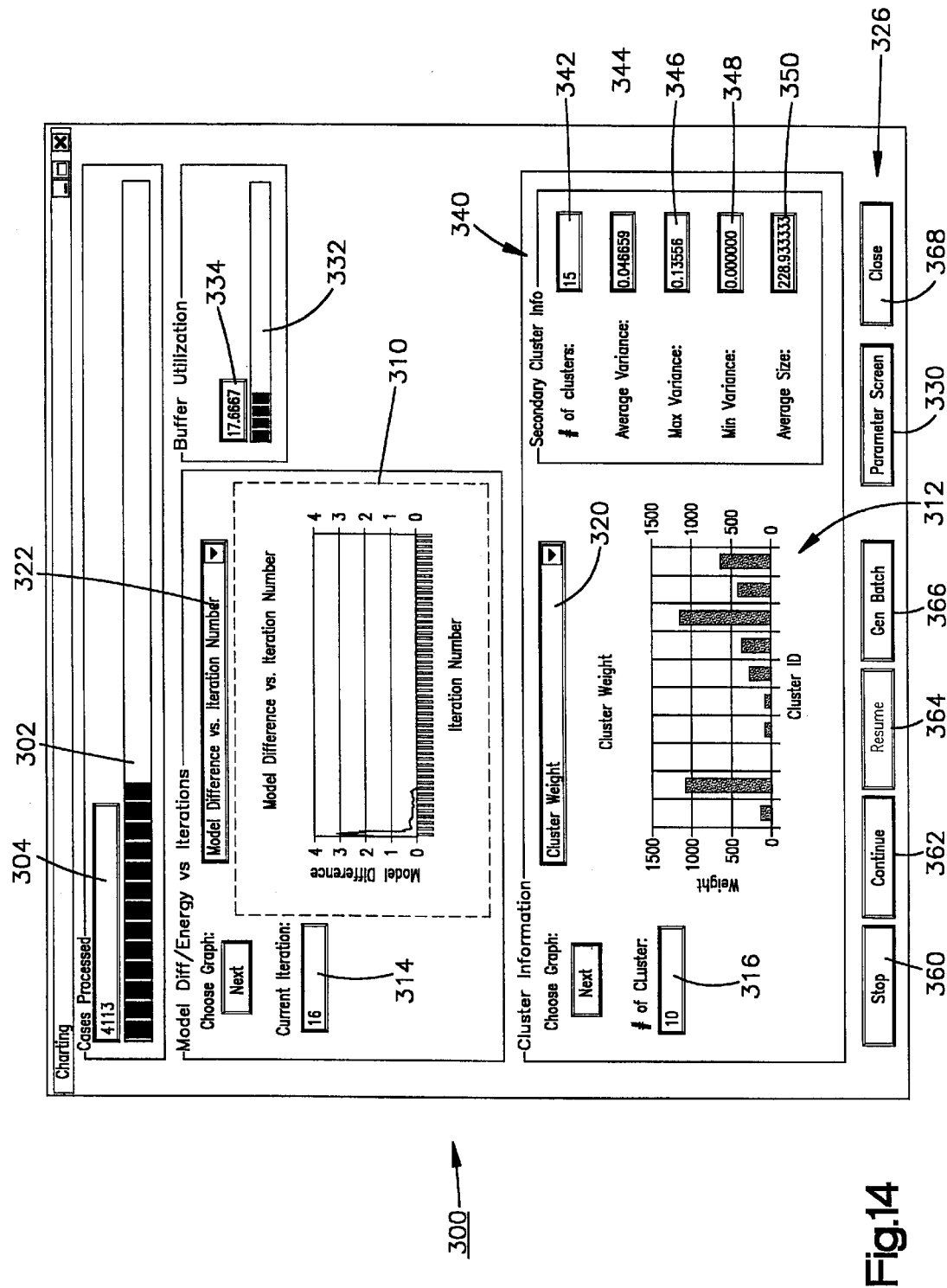

Consider a two dimensional depiction of data from a database illustrated in FIG. 9. Spaced across the two dimensional space of the Figure are a number of data points. In a typical database this would be a depiction of two attributes of a multi-attribute record.

One can visually determine that the data in FIG. 9 is lumped or clustered together. Classifying the data into clusters is dependent on a staring cluster number. If one chooses three clusters for the data of FIG. 9 the data would generally fall into the clusters K1, K2, K3 of the figure.

The K-Means algorithm takes as input: the number of clusters K, a set of K initial estimates of the cluster means, and the data set to be clustered. The means (centroids) define the parameters of the model. One traditional K-means evaluation starts with a random choice of cluster centroids or means that are randomly placed within the extent of the data on the x axis. Call these M1, M2, and M3 in FIG. 9.

Each cluster is represented by its mean and each data item is assigned membership in the cluster having the nearest mean. Distance is the Euclidean distance (or L2 norm): for a data point (d-dimensional vector) x and mean $\mu$, is given by:

$$\text{Dist}(x, \mu) = \sqrt{\sum_{i=1}^{d} (x_i - \mu_i)^2}.$$

The cluster model is updated by computing the mean over the data items assigned to it. The model assumptions relating to the classic K-Means algorithm are: 1) each cluster can be effectively modeled by a Gaussian distribution with diagonal covariance matrix having equal diagonal elements (over all clusters), 2) the mixture weights ($W_i$) are also assumed equal. Note that K-Means is only defined over numeric (continuous-valued) data since the ability to compute the mean is a requirement. A discrete version of K-Means exists and is sometimes referred to as harsh EM. The K-Means algorithm finds a locally optimal solution to the problem of minimizing the sum of the L2 distance between each data point and its nearest cluster center (usually termed "distortion").

For a database that fits in memory all data within the database can be used to calculate the K-means clustering centroids. The output from such a prior art process will be the K centroids and the number of data points that fall within each of the K clusters.

In accordance with the present invention, the data from the database 10 is brought into a memory 22 (FIG. 1) and once the K-means calculation is performed it is assigned to one of three data sets. A retained data set (RS) is kept in memory 22 for further use in performing the K-means analysis. A so called discard data set (DS) and a compressed data set (CS) are summarized in the form of sufficient statistics that are retained in memory. For a random sampling of data the more data that is gathered the better the clustering calculation becomes. For a process in accordance with the present invention the estimates do get better as more data is sampled, but the estimates are accurate even though memory requirements limit sampling to a low percentage of the entire data base.

Data Structures

FIGS. 6A–6D summarize the data structures used to perform the scalable K-means analysis. The output from the analysis is stored in a data structure designated MODEL (FIG. 6D) which includes an array 152 of pointers, each pointer points to a first vector 154 of n elements (floats) 'Sum', a second vector 156 of n elements (floats) 'SumSq', and a scalar 158 designated M. The number n corresponds to the number of attributes of the database records that are being clustered.

Figure 6A:
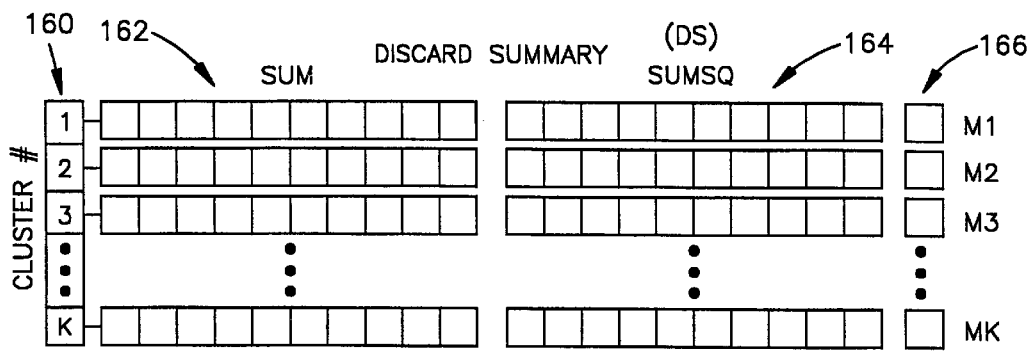
FIGS. 6A–6D are illustrations of data structures utilized for storing data in accordance with the exemplary embodiment of the invention.
Figure 6B:
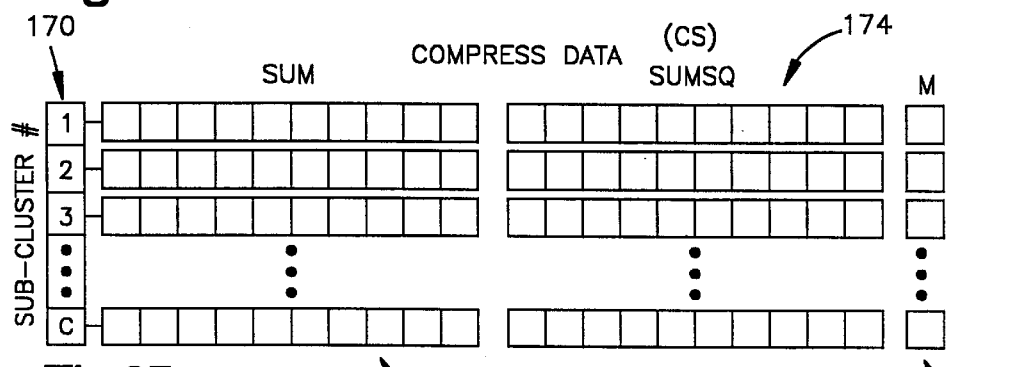
Figure 6C:
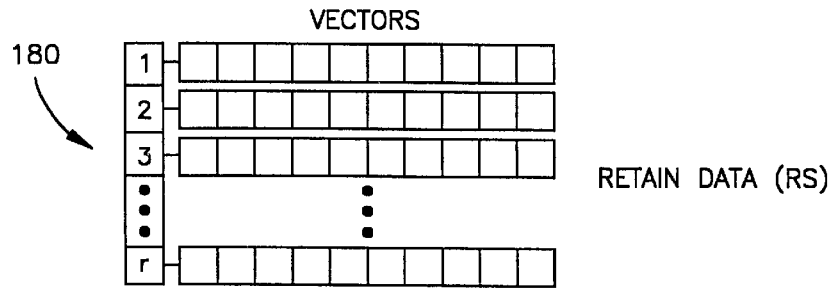
Figure 6D:
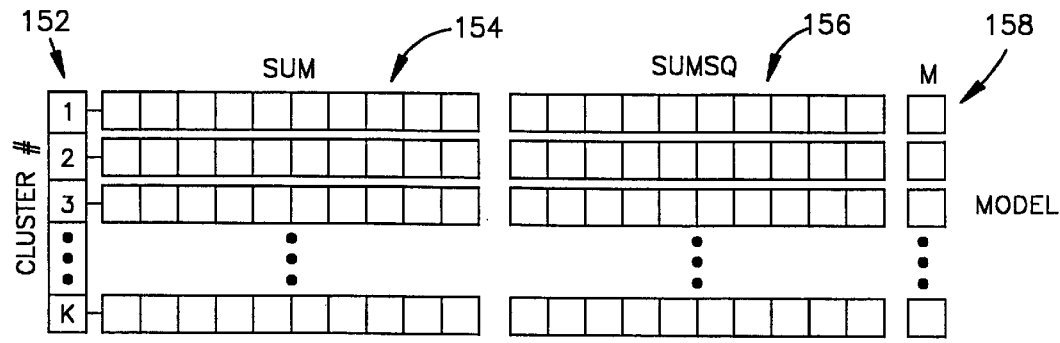

FIG. 6A depicts a data structure designated DS including an array 160 of pointers, each of which identifies a vector 162 of n elements (floats) 'Sum', a vector 164 of n elements (floats) 'SumSq', and a scalar 166 designated 'M'.

A further data structure designated CS is an array of c pointers 170, where each pointer points to a vector 172 of n elements (floats) 'Sum', a vector 174 of n elements (floats) 'SumSq', and a scalar 176 designated as M.

An additional data structure designated RS (FIG. 6C) is an array 180 of r elements where each element points a vector of n elements (floats) representing a singleton data point of a type designated SDATA. As data is read in from the database it is stored in the set RS and this data is not associated with any of the K clusters. An exemplary implementation of the scalable K-means analysis has RS being an array of pointers to elements of type SDATA, and an associated SumSq vector is null and the scalar M=1.

Figure 8:
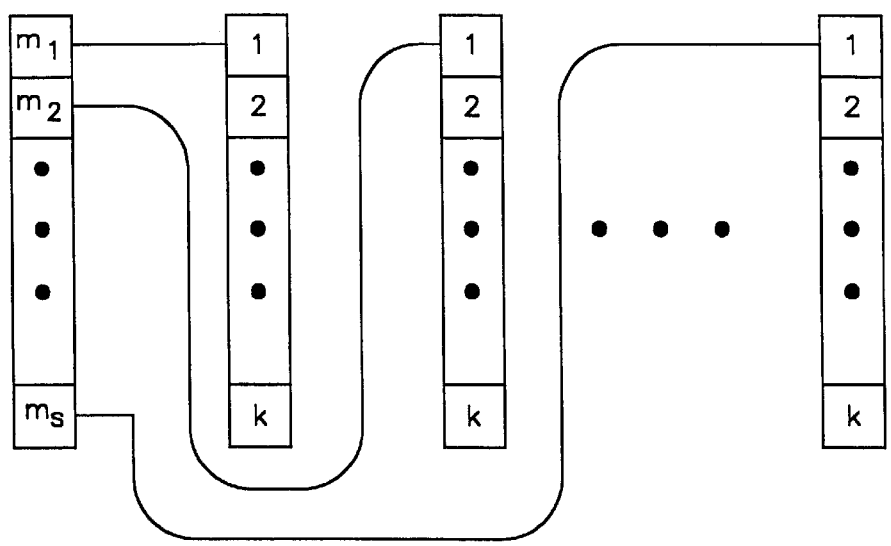
FIG. 8 is a data structure for use in determining multiple data models through practice of the exemplary embodiment of the present invention.

In an exemplary embodiment of the invention, multiple models are simultaneously generated. This structure is depicted in FIG. 8 wherein multiple models are pointers to arrays of models such as the data structures shown in FIG. 6D.

Table 1 below is a list of ten SDATA vectors which constitute sample data from a database 10 and are stored as individual vectors in the data structure RS.

TABLE 1

| CaseID | AGE | INCOME | CHILDREN | CARS |
|--------|-----|--------|----------|------|
| 1 | 30 | 40 | 2 | 2 |
| 2 | 26 | 21 | 0 | 1 |
| 3 | 18 | 16 | 0 | 1 |
| 4 | 45 | 71 | 3 | 2 |
| 5 | 41 | 73 | 2 | 3 |
| 6 | 67 | 82 | 6 | 3 |
| 7 | 75 | 62 | 4 | 1 |
| 8 | 21 | 23 | 1 | 1 |
| 9 | 45 | 51 | 3 | 2 |
| 10 | 28 | 19 | 0 | 0 |

Table 2 below tabulates mean values chosen for a starting point assuming K=3 for performing the scalable K-means clustering analysis on the data of table 1.

TABLE 2

| Cluster # | AGE | INCOME | CHILDREN | CARS |
|---|---|---|---|---|
| 1 | 55 | 50 | 2.5 | 2 |
| 2 | 30 | 38 | 1.5 | 2 |
| 3 | 20 | 24 | 1 | 1 |

An important concept of the present invention is the summarization or compression of data points of type SDATA contained in the dataset RS (TABLE 1) sampled from the database into the two data structures DS, CS to allow more sampling of data from the database. During each processing iteration of the FIG. 4 flowchart the scalable K-means analysis calls an 'extended K-means' procedure 120 that utilizes the compressed data as well as the remaining data samples contained in the dataset RS.

On a first iteration through the FIG. 4 process the set DS (FIG. 6A) is empty. Updates to the set DS are performed at the step 130 for each cluster of the range, i=1, . . . , K. For each cluster i the processor determines which singleton data elements (elements of the set RS of type SDATA), assigned to cluster i will not change cluster membership over future data samples. These points will be used to augment the i-th element of the set DS which contains the sufficient statistics summarizing these singleton points. These points are removed from the set RS and used to update the sufficient statistics for the i-th cluster of the set DS.

Two conceptual data structures help explain a first embodiment of the method of updating the set DS. This first embodiment is referred to as the Worst Case Analysis method. These conceptual data structures hold the upper and lower bounds defining an n-dimensional (n=# attributes) confidence interval (CI) on the parameters of the model (in case of K-means the parameters are the means or centroids of the K clusters) computed so far. A list structure designated LOWER is a vector of k elements (one for each cluster) where each element points to a vector of n elements (floats) holding the lower bounds for each attribute of the CI on the mean of the corresponding cluster. For example LOWER (3).LowVec(2) is the value of the lower bound on the CI for the third cluster along dimension 2. A second structure designated UPPER is a vector of K elements (one for each cluster) where each element points to a vector of n elements (floats) holding the upper bounds for the CI on the parameters of the model (mean or centroid in case of K-means) of the corresponding cluster. Singleton Points (Elements of RS) not changing cluster assignment when the K cluster centers are perturbed, within their respective confidence intervals in a worst-case fashion, can be summarized by adding them to the set DS and removing them from RS. Appendix A is a summarization of the Worst Case Analysis that defines LOWER and UPPER as well as the process of updating of the set DS using the Worst Case Analysis.

A second embodiment of the process of updating the dataset DS is referred to as the Threshold Analysis. For this second embodiment a data structure is used that helps sort the singleton elements of RS (of type SDATA) by their Mahalanobis distance ( See Duda and Hart, Pattern Classification and Scene Analysis referenced above) to a given cluster center. A structure RSDist is a list of r elements (r is the number of singleton data elements in the set RS) where each element in RSDist points to 2 objects: 1) float called "MahalDist" which holds the Mahalanobis distance of the corresponding element in RS to the nearest cluster center and 2) an integer indicating the cluster whose center is nearest to the given point in RS, called "ClustAssign". Appendix C summarizes the calculation of the Mahalanobis distances.

NOTE that Mahanalobis Distance is used in case of K-means as an example. In general, we require the ability to measure the distance of a point to a cluster. This distance can be obtained from any model as the probability that a data item belongs to the cluster. Low probability data items are FAR, while high probability items are CLOSE according to this distance. Our framework for scaling clustering in general requires ability to extract this notion of "distance". This is always possible, regardless of model being used. The Mahalanobis distance in case when clusters are represented by multivariate Gaussians is directly proportional to probability assigned to a data item by the Gaussian in that cluster.

A third embodiment for updating the dataset DS is based upon the distance of a data point from the then current parameters characterizing the cluster (e.g. the cluster mean in K-means). If this distance for a point rs contained in RS is less than a specified distance, then the point is removed from RS and added to DS by updating the sufficient statistics of DS to include the rs point.

Figure 5:
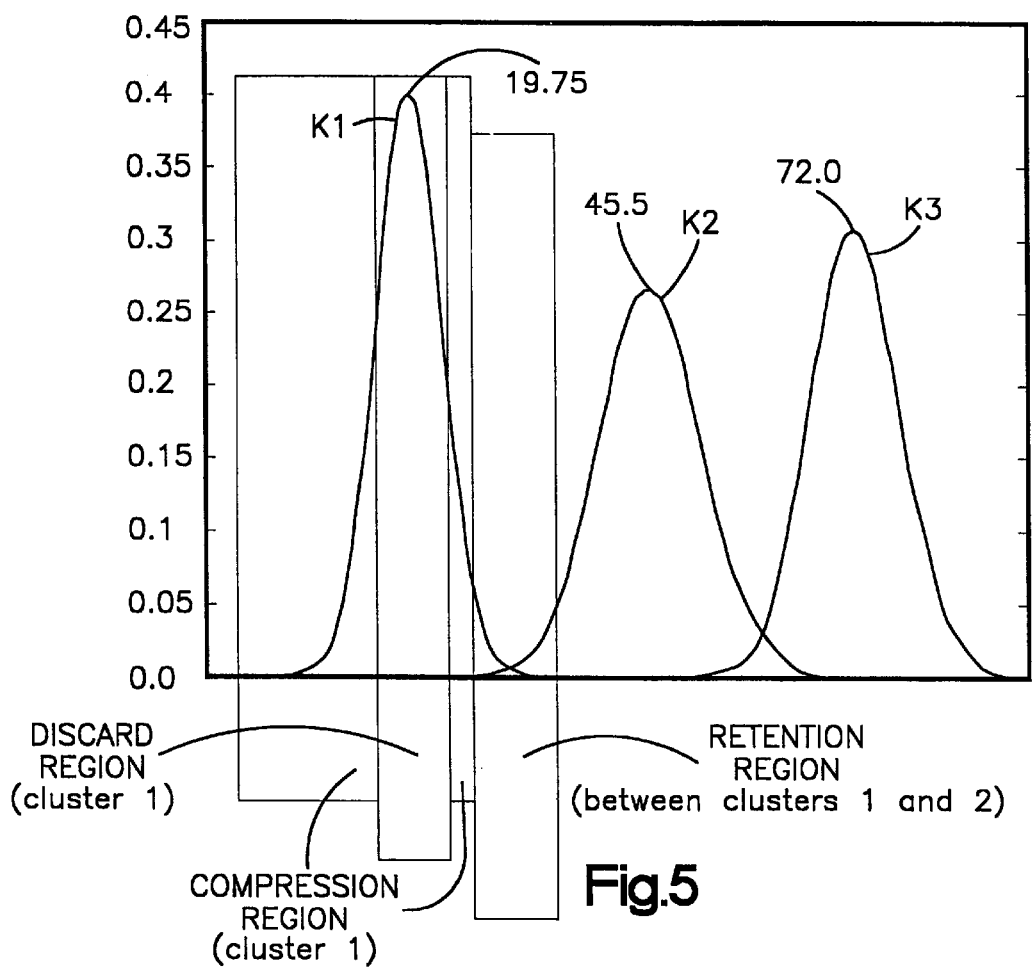
FIG. 5 is a one-dimensional plot of data distribution of three clusters of data.

FIG. 5 depicts a clustering in one dimensional, for example, income data from the table 1 list of data. Three clusters K1, K2, K3 are made up of much larger numbers of data vectors SDATA. The data structure DS that summarizes data for the cluster designated K1 is centered within the generally Gaussian shaped curve depicting that cluster. Regardless of the technique used, certain data safely 'belongs' to the cluster K1 so it is safe to compress or summarize the data in this range in the form of the sufficient statistics contained in the DS (discard region) data structure.

Subclusters in Dataset CS

After the compression of data into the DS data structure, there is still a fairly large amount of data (SDATA) contained to the left and the right of the centroid of K1 in FIG. 5 that neither the worst case analysis (Appendix A) nor the threshold analysis (Appendix B) identifies for compression into the set DS. These point fall within the 'compression region' for cluster 1. The present invention also summarizes at least some of this data in the form of a dataset designated CS. An exemplary process for determining the CS dataset is summarized in the psuedocode of Appendix C. Briefly, a dataset RSNew is made up of the dataset RS after removing the set DS from the original set RS.

The process of determining the new CS data set begins by merging and removing any singleton points from RSNew into CS which can safely be merged without violating a specified "density" criteria. For each data point in RSNew, the appendix C procedure finds the CS subcluster which is closest to it. If the data point can be merged into CS without violating the specified "density criteria" of the CS subcluster, then the data point is merged into that particular CS subcluster and removed from RSNew. If it doesn't satisfy the criteria, then the data point is left in RSNew.

The process of determining the data set CS then continues by finding a set of "dense" subclusters within the set RSNew. This is done by performing a traditional K-means analysis on the data in the set RSNew using a cluster number K' (Kprime) greater than K, the number of clusters used in performing the scalable K-means analysis. The set of sufficient statistics (Sum, Sumsq, and M) for the K' subclusters found by this procedure are appended to the current set of sufficient statistics in the dataset CS. Hence CS is augmented by K' elements to produce a number c of subclusters. This augmented list is then filtered and elements are merged (if possible), reducing the size of the list. Note that regardless of clustering algorithm being used in the main scalable framework (i.e. the clustering algorithm being scaled to large DB), the clustering algorithm used to determine CS can be different. K-means is disclosed for secondary clustering (determining CS), but other clustering algorithms can be employed [including hierarchcal agglomerative clustering or any other clustering technique to find local structure in CS].

If the number of data points (M in the data structure CS) is less than a threshold value, (MinPoints in Appendix C) the data from this analysis is not clustered and the data is instead kept in the set RSNew. Furthermore only dense clusters are kept in CS. For each subcluster remaining after the threshold value of points criteria has been checked, if the maximum measure of spread computed from (SUMSQ) along any of the n dimensions (attributes) of the candidate subcluster is less than a threshold (StdTol in appendix C) the data from that subcluster is also left in RSNew and not summarized in CS. These two criteria remove the elements of CS corresponding to subclusters which are either too small (in terms of number of points) or too 'spread out'.

A final step is the combining of subclusters using hierarchical agglomerative clustering. An attempt is made to merge two elements of the dataset CS. If the larger, merged subcluster still satisfies the 'spread' criteria discussed above, these two subclusters are removed from the set CS, and the larger subcluster representing these two smaller subclusters is added to the dataset CS. This process continues until the merging process produces no larger subclusters that still satisfy the "dense" criteria. The data structure CS contains c elements that are then used in the K-means analysis.

Extended CLUSTERING Procedure

Figure 7:
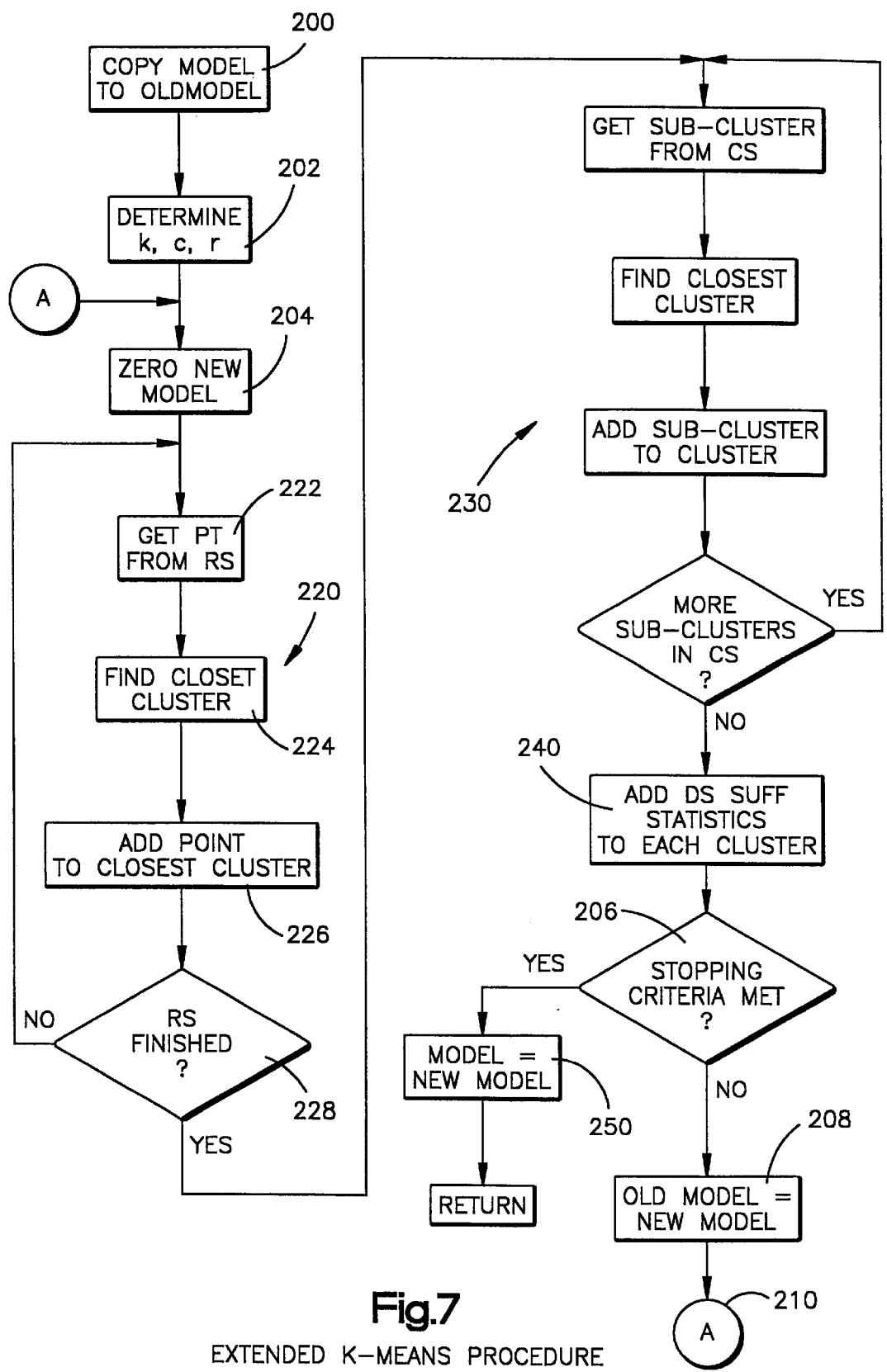
FIG. 7 is a flow diagram of an exemplary embodiment of an extended K-means analysis of data.

An extended CLUSTERING procedure 120 includes looping constructs for updating the current model that are summarized in the flow chart of FIG. 7. Certain utility functions are needed to perform this extended CLUSTERING procedure. A function ModelCopy( ModelNew, ModelOrig) copies the model ModelOrig into ModelNew. A function Length( DataStructure) returns the length of the pointer array for the data structures of FIG. 6 so that for example, Length(CS)=c and Length(RS)=r. Zero(Model) takes the data structure for the model in FIG. 6D and sets all elements to 0.0. A function Distance2Norm(point1, point2) measures the distance between two vectors point1 and point2.

The extended K-means procedure of FIG. 7 begins with a step 200 of copying the existing model into an old model data structure. The process next determines 202 the length of the RS, DS, and CS data structures of FIGS. 6A–6C and returns the values k, c, and r. The data structure NewModel is then zeroed or initialized 204. The process updates the NewModel until a test 206 indicates a stopping criteria has been met. If the stopping criteria has not been met, the process saves 208 the new model in the old model data structure and branches 210 to zero a next subsequent new model. The test 206 is similar to the test 140 described in conjunction with the scalable K-means process overview.

After initialization of a new model, that model is updated in a loop 220 that updates the model for each of the r vectors in the dataset RS. The loop gathers data 222 a point at a time from the set RS and determines 224 what cluster to assign that data point to. This is done by finding the distance from the data point to the mean of each of the then existing means of the old model. By reference to FIG. 6D (for particular example of sclaing K-means, hence EXTENDED K_MEANS algorithm) it is seen that the model includes the Sum for a given cluster K and therfore the mean or centroid of each dimension is given by this value divided by the scalar M for the cluster. Once the closest cluster is found, the New model Sum and SumSq component for that closest cluster is updated by adding the data point to the vector Cluster(closest).sum and then squaring the components and adding them to the Cluster(closest).SumSq vector. The scalar M for a cluster is incremented by one for each point added to that cluster.

Once the loop over the r vectors is completed, the procedure updates the model based on the compressed statistics stored in the c subclusters found in the data structure CS. On an initial loop through the FIG. 4 scalable K-means process there are no CS or DS structures. Table 3 below indicates the contents of the model (FIG. 6D) after the RS portion of the extended K-means process on data points of Table 1.

TABLE 3

| Cluster # | AGE | INCOME | CHILDREN | CARS | M |
|---|---|---|---|---|---|
| | | SUM | | | |
| 1 | 228 | 288 | 15 | 9 | 4 |
| 2 | 75 | 91 | 5 | 4 | 2 |
| 3 | 93 | 79 | 1 | 3 | 4 |
| SUMSQ | | | | | |
| 1 | 51984 | 8244 | 225 | 81 | |
| 2 | 5625 | 8281 | 25 | 16 | |
| 3 | 8649 | 6241 | 1 | 9 | |

The ten records of TABLE 1 will fit in memory, and a conventional K-means analysis is possible. For a large data base containing millions of records, the ten records constitute only a part of one data gathering step. Table 4 below lists a K-means clustering of data performed on the ten records with K=3.

TABLE 4

| Cluster # | AGE | INCOME | CHILDREN | CARS |
|---|---|---|---|---|
| 1 | 57 | 72 | 3.75 | 2.25 |
| 2 | 37.5 | 45.5 | 2.5 | 2 |
| 3 | 23.25 | 19.75 | 0.25 | 0.75 |

To free up computer memory for gathering more of the millions of records some of the ten records shown in Table 1 are candidates to be compressed into the data structures CS, DS. The cluster averages for the income attribute of the ten records are labeled in the FIG. 5 depiction. Record number 10 has an income of '19' and for this one dimension falls safely within the DS (discard region) centered around the cluster K1 in FIG. 5. Visualizing the situation over many attributes becomes more difficult but the techniques summarized in the appendices deal with vectors and identify records within RS for compression. Record number 8 in Table 1 has an income of '23'. Assume this record does not fall within the DS region and therefore becomes a candidate for inclusion in the CS (compress) dataset. Note, the cluster mean for the second cluster K2 is at an income of 45.5 k dollars. Data falling between the two means of 19.75 and 45.5 typically will not be classed in either the DS or the CS dataset. It is retained in RS and used on the next iteration to perform the clustering.

After the initial iteration of the FIG. 4 process, the CS and DS structures contain sufficient statistics, and the extended clustering procedure of FIG. 7 must take into account this data in determining the new model when the procedure is called at the step 120 of the scalable K-means analysis. To update the model based on the sufficient statistics contained in the dataset CS the FIG. 7 procedure executes a loop 230 over each of the subclusters c in CS and determines which of the K clusters in the Model (FIG. 6D) that subcluster is closest to. Assume subcluster p is closest to cluster q. When this fact is discovered the sufficient statistics of cluster q are updated by adding the contents subcluster(p).sum to cluster (q).sum and the statistics subcluster(p).sumsq to cluster(q).sumsq. Additionally, the value of subcluster(p).M for the subcluster is added to the to the value cluster(q).M.

At a step 240 the extended CLSUTERING procedure updates the NewModel for the clusters summarized in DS. There is no need to search for the cluster nearest the clusters in DS since the elements of DS will always (or are assumed to be always) assigned to the same cluster. The step 240 merely loops over the clusters in DS and adds their sufficient statistics to the new model of FIG. 6D. In case of K-means example: (NewModel(l).Sum+=DS(1).Sum, NewModel(1).SumSq+=DS(1).SumSq and NewModel(1).M+=DS(1).M). Once the contributions of CS and DS are added the stopped criteria is checked 206 to see if the procedure has converged to a solution. In one exemplary embodiment a variable CenterDist is set to zero and for each of the clusters K, a distance between the centroid of the old model and the centroid of the new model is determined and added to the CenterDist variable. Once all K distances have been calculated, and added together the CenterDist value is divided by the number of clusters K and compared to a value 'StopTol' which is used as a measure of how stable the model has become. If the value of CenterDist is smaller than the value 'StopTol' then the procedure returns, otherwise the procedure branches back to recalculate the model using the same data in RS, CS, and DS but with a different "old model".

Stopping Criteria at the Step 140

Each time the procedure 120 returns, the RS, DS and CS data structures are updated and the test of the stopping criteria 140 is performed. Three alternative stopping criteria are proposed for use in the scalable K-mean procedure. (methods 1 and 2 of the Appendix D pseudocode summarize two of these criteria). A first method terminates the analysis if the difference between the K-means, measured in some norm, over a given number of data samples is below a given tolerance. A second method terminates if the difference in an "energy" function (measure of distortion) minimized by the k-mean analysis falls below a given tolerance over a fixed number of data samples. A third terminates if the number of data samples from the database is exhausted. A fourth stopping criteria is actually a suspension of the scalable K-means analysis rather than stopping.

We note that if storage permits, the most general storage scheme would keep in main memory the last z models, hence easily allowing the plug-in of either stopping criteria 1 or 2 by easily computing either PrevModelDiff (in the case that the first stopping criteria is chosen, (see appendix D) from these z models or by computing PrevEnergyDiff (in the case that the second stopping criteria is chosen, see appendix D).

As seen in FIG. 1 the computer 20 includes a monitor 47 for displaying a user interface. A suitable interface for monitoring the clustering analysis of FIG. 4 includes a reference to the amount of data as a percentage of the entire database 10 that has been used in defining the model shown in FIG. 6D. This interface allows the user to activate a button to suspend the operation of updating the model as well as adjusting the stopping criteria (Appendix D). The ability to suspend allows the database to be updated and then clustering can be resumed without resorting to a completely new analysis. This ability is particularly advantageous when clustering large databases where obtaining even a part of the data can take significant time.

User Interface

FIGS. 10–14 illustrate user interface screens that are depicted on a monitor 47 as data is clustered. These screens are illustrated in the example of the clustering framework described in this invention applied to scaling the K-means algorithm in particular. Scaling other clustering algorithms involves displaying potentially other relevant information concerning the model being constructed. Of course, this affects only display of quantities pertaining to specific model. General notions such as progress bar (302), information like 304, and buffer utilization 334, and 332 are independent of clustering algorithm and do not change with change in clustering algorithm. Turning to FIG. 9, this screen 300 illustrates a clustering process as that clustering takes place. A progress bar 302 indicates what portion of the entire database has been clustered and a text box 304 above the progress bar 302 indicates how many records have been evaluated. In a center portion of the screen 300 two graphs 310, 312 illustrate clustering parameters as a function of iteration number and cluster ID respectively. The first graph 310 illustrates progress of the clustering in terms of iteration number which is displayed in the text box 314. The iteration number refers to the number of data gathering steps that have occurred since clustering was begun. In the FIG. 9 depiction an energy value for the clustering is calculated as defined in Appendix D method 2. As the clustering continues the energy decreases until a stopping criteria has been satisfied. In the graph 310 of FIG. 9 sixteen iterations are depicted.

The second graph 312 at the bottom of the screen is a graph of clustering parameters as a function of cluster number. In the depiction shown there are ten clusters (shown in the text box 316) and the minimum covariance for each of these ten clusters is shown. Covariance is defined from the model data (FIG. 6D) for a given cluster and a given dimension by the relation:

$$SumSq/M - Sum*Sum/M^2$$

A plot of minimum covariance is therefore a plot of the dimension (1 ... n) for a given cluster model having the least or minimum covariance. A drop down list box 320 allows the user to select other indications of covariance. By selecting a maximum for this parameter, a depiction of the dimension of the model having the maximum covariance (FIG. 10) for each of the ten clusters is shown in the bar graph 312. An average covariance bar graph (FIG. 12) indicates the average of the covariance for each cluster over all cluster dimensions. A different user selection via the drop down list box 320 (FIG. 13) shows the weight M for the ten clusters. In a similar manner, a dropdown list box 322 allows different cluster parameters such as model difference (Appendix D, method 1) to be plotted on the graph 310.

A row 326 of command buttons at the bottom of the screen allow a user to control a clustering process. A parameter screen button 330 allows the user to view a variety of clustering parameters on a parameter screen (not shown). By accessing this screen the user can determine for example a maximum number of records or tuples that can be brought into memory to the data set RS in a given iteration. As in example, the user could indicate that this maximum value is 10,000 records.

As outlined above, as the clustering process is performed data is summarized in DS, CS, and stored in RS. If a number of 10,000 records is chosen as the maximum, the system limits the number of new data that can be read based upon the number of subclusters in the data set CS. Designate the number as ROWSMAX, then the amount of data records that can be currently stored in RS (Rscurrent) is ROWSMAX−2*c where c is the number of subclusters in CS. A progress bar 332 indicates a proportion of data buffers that are currently being used to store RS and CS datasets. This is also depicted as a percentage in a text box 334.

Other parameters that can be modified on the parameter screen are choice of the stopping tolerance, choice of the stopping procedure, choice of parameters for combining subclusters and adding data points to subclusters, and choice of the compression procedure used to determine DS data set candidates. The parameter screen also allows the user to define where to store the model upon completion of the clustering. If a process is suspended and the model is stored, the user can also use this screen to browse the computer disk storage for different previously stored models.

Current data regarding the dataset CS is depicted in a panel 340 of the screen. Text boxes 342, 344, 346, 348 in this panel indicate a number of subclusters c, and average, minimum and maximum variances for the subclusters using the above definition of variance. A last text box 350 indicates the average size of the subclusters in terms of data points or tuples in the subclusters.

Additional command buttons allow the user to interact with the clustering as it occurs. A stop button 360 stops the clustering and stores the results to disk. A continue button 362 allows the process to be suspended and resumed by activating a resume button 364. A generate batch button 366 allows the user to generate a clustering batch file which can be executed as a separate process. Finally a close button 368 closes this window without stopping the clustering.

Multiple Model Embodiment

Figure 2:
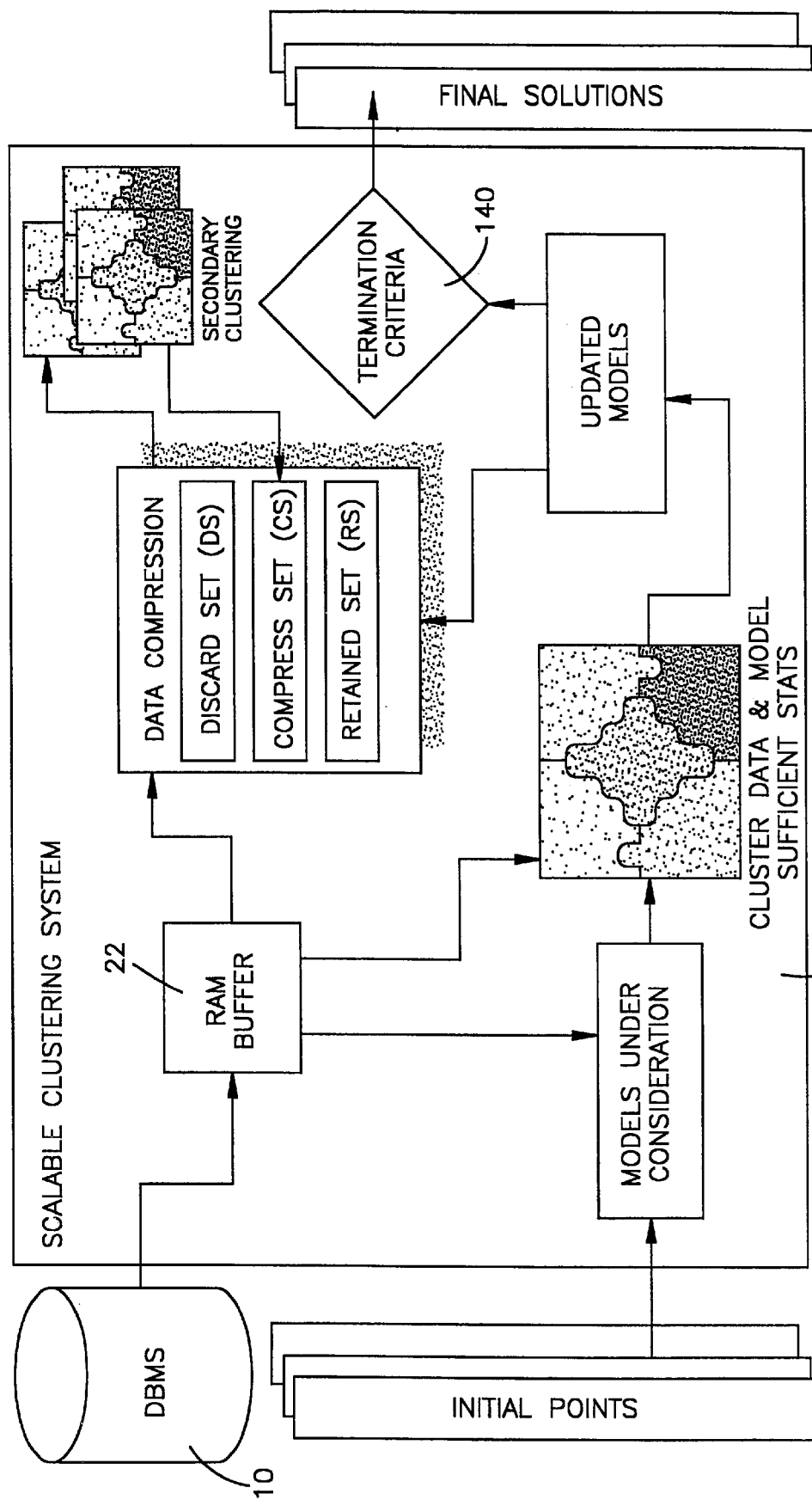
FIG. 2 is schematic depiction of a clustering process of the invention wherein multiple clustering models are obtained during a single scan of the a database.

In accordance with an alternate embodiment of the present invention, the process of FIG. 4 is supplemented with a model optimizer. In accordance with this embodiment, a multiple number of different clustering models S are simultaneously generated by the computer 20. The multiple model clustering is depicted in the schematic of FIG. 2 and the data structure of FIG. 8. The disclosed procedures for data compression and storing of sufficient statistics allows updating multiple models simultaneously, within a single data scan. K-means, as well as many other members of the iterative clustering algorithms, are well-known to be extremely sensitive to initial starting condition. However, standard practice usually calls for trying multiple solutions from multiple random starting points. One process for choosing multiple starting points is disclosed in copending patent application entitled "A method for refining the initial conditions for clustering with applications to small and large database clustering." Which was filed in the United States Patent and Trademark Office on Mar. 4, 1998 and is assigned to the assignee of the present invention.

To support standard practice in clustering, the invention includes the ability to explore multiple models. The key insights for this generalization are:

Retained points RS and the sets CS (representing local dense structures) are shared amongst the all models;

1) Each model, say Mi, will have its own discarded data sets $DS_{Mi}$ (K sets, one for each cluster for each model)—if there are m models, there are a m×K discard sets;

2) The sufficient statistics for discarded data sets $DS_{Mi}$ for one of the models Mi are simply viewed as members of the global CS by all models other than Mi.

The overall architecture remains the same as the one shown in FIG. 2, except that model updating and data compression steps are now performed over multiple models. Besides these observations there is at least one other data compression item worthy of further discussion: data discard order when multiple models are present. The algorithm decides on an individual data point basis which discard set fits it best. A data point that qualifies as a discard item for two models simply goes to the discard set of the model that it "fits" best. A data point cannot be allowed to enter more than one discard set else it will be accounted multiple times. Let x qualify as a discard item for both models M1 and M2. If it were admitted to both, then model M1 will "feel" the effect of this point twice: once in its own DS1 and another time when it updates over DS2 which will be treated as part of CS as far as M1 is concerned. Similarly for M2. By entering in exactly one discard set, say DS1, the point x still affects M2 when NU updates over CS and counts DS1 as part of CS.

There is an array S pointers $m_1 \ldots m_s$ where each pointer points to a different model data structure. The model data structure is depicted in FIG. 6D. In this embodiment the structure CS and RS are shared by the multiple models.

Each of the models $m_s$ is initialized with a different set of parameters (e.g. centroid vectors in case of K-means) (value of 'sum', M=1) for the K different clusters of the model. When data is gathered at the step 110, that data is used to update each of the S models. An extended CLUSTERING procedure for the multiple model process takes into account the multiple model aspects of the structures DS and CS is performed on each of the S models. On a first iteration through the FIG. 4 process there is no DS or CS dataset for any of the models so that all data is in the RS dataset. A given data point $r_s$ in the data set RS is compressed into the dataset $DS_j$ for only one of the S models even though it may have a high probability of membership to another DS set. The data point $r_s$ is assigned to the set DS of the model that gives it the highest probability of membership (in case of K-means this would be the DS associated with cluster having centroid that is closest to the point $r_s$).

DS structures for all the S models are determined by compressing data points into the appropriate DS data structure. The CS data structures for each of the models are then determined from the points remaining in RS. When performing the extended CLUSTERING procedure 120, however, the CS sufficient statistics must be augmented with the sufficient statistics contained in the DS data structures of the other models. When performing the extended CLUSTERING procedure to update a given model $m_j$, the subclusters in CS must be augmented with the DS structures from the other models. Specifically, when updating model $m_j$, the extended K-means procedure considers the augmented set $CS_j$=CS U (union) $DS_1$ U $DS_2$ . . . $DS_{j-1}$ U $DS_{j+1}$ U . . . $DS_s$ when performing the loop 230 of FIG. 7. If a data point is compressed into DS, it enters the DS set of only one model at the step 240, hence there is no double counting of data. The multiple model analysis can be performed until one of the models satisfies the stopping criteria at the step 140. An alternate system would continue to compute all the models until each model reaches a stopping criteria. Additionally, the scalable K-means process could be performed until a certain percentage of the models have reached a stopping criteria. The multiple model implementation shares data structures between models and performs calculations on certain data unique to a given model. This analysis is susceptible to parallel processing on a computer 20 having multiple processing units 21.

It has been assumed that each of the data points that is accessed and used in the the K-means clustering procedure has the same weight as other data. Recall, however, that the process can allow suspension of a model build and resumption at a later time. The stopping criteria can be reached and the model stored and later used for whatever purpose the user desires. It is therefore possible that the database can be updated between clustering. In those instances it may be desirable to weight more recently added data more heavily than the data records used to cluster a database from a prior time. In this instance the recent records can be weighted by a heavier factor such as 1.5 per data point. Thus, when updating the Sum, Sumsq, and M components of the various data structures the weighting factor is applied to the data before updating the summaries.

By assigning the data to one of K clusters the invention provides a way to add an additional attribute or dimension to the data, i.e. cluster number. This additional attribute can be used as an index field for the data in the database. It can also be used as a pivoting attribute to reorganize and present the data in a different fashion to the user of the database.

COMPUTER SYSTEM

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

The following APPENDICES describe components of the scalable clustering analysis Appendix A—Worst Case Analysis Assume that the following functions are available:
1. [tValue]=ComputeT( alpha, DegreesFreedom): computes the t-statistics for the given value of alpha (1-ConfidenceLevel, in our case) and DegreesFreedom (# of points in a cluster—1 in our case).
2. DSCopy( DSNew, DSOrig): copies DSOrig into DSNew, DSNew is altered, DSOrig remains the same.
3. [WeightVec]=ComputeWeightVec( DataPoint, Model) for K-Means, returns the {0,1} weight vector indicating the cluster to which DataPoint is assigned.

4. AddRS( DataPoint, RS ): appends singleton DataPoint to the end of RS, RS is increased by 1 point.

The following functions determine the new sets DS and RS from the old sets, the current Model, and given ConfidenceLevel which is a number between 0 and 1.

```
[ DSNew, RSNew ]=WorstCaseAnalysis( DS, RS, Model,
    ConfidenceLevel )
{
  RSNew=empty;
  k=Length( Model );
  r=Length( RS );
  // first determine values for LOWER and UPPER
  alpha=1-ConfidenceLevel;
  for l=1, . . . ,k
  {
    Mean=Model(l).GetMean( );
    CVDiag=Model(l).GetCVDiag( );
    TValue=ComputeT( (alpha/n), Model(l).GetNum( )-1); // correct t-value
    For j=1, . . . ,n
    {
      LOWER(l).LowVec(j)=Mean(j) - (TValue)*
        sqrt( CVDiag(j)/(Model(l).GetNum( )));
      UPPER(l).UpVec(j)=Mean(j)+(TValue)*
        Sqrt( CVDiag(j)/(Model(l).GetNum)));
    }
  }
  // Copy DS into DSNew
  DSCopy( DSNew, DS );
  // for each singleton element in r, perform the worst-case
      "jiggle" and determine
  // if the cluster assignment for this data point changes, if
      so keep in RS, if not, put
  // in DSNew
  for j=1, . . . ,r
  {
    DataPoint=RS(j).RSVec;
    // Determine the cluster to which this data point is
    assigned
    [TrueWeightVec]=ComputeWeightVec( DataPoint,
    Model );
    // Zero out the perturbed model
    Zero( PerturbModel);
    // determine the perturbed model for this data point
    for l=1, . . . ,k
    {
    Mean=Model(l).GetMean( );
    If ( TrueWeightVec(l)==1.0) // DataPoint is assigned to
      cluster 1
    {
      // the perturbed model center is as far away from
        DataPoint
      // as possible
      for h=1, . . . ,n
      {
        if ( DataPoint(h)>=Mean(h) )
        {
          PerturbModel(l).Center(h)=
            LOWER(l).LowVec(h);
        }
        else
        {
          PerturbModel(l).Center(h)=
            UPPER(l).UpVec(h);
        }
      }
    }
    else
    {
      // the data point is not assigned to model 1, move the
      // perturbed
      // center as close to data point as possible
      for h=1, . . . ,n
      {
      case ( DataPoint(h)>=UPPER(l).UpVec(h) )
      {
        PerturbModel(l).Center(h)=
          UPPER(l).UpVec(h);
      }
      case ( DataPoint(h)<=LOWER(l).LowVec(h) )
      {
        PerturbModel(l).Center(h)=
          LOWER(l).LowVec(h);
      }
      otherwise
      {
        PerturbModel(l).Center(h)=DataPoint(h);
      }
      }
    }
    }
    // at this point the perturbed model has been determined
    for the given data
    // point
    // determine the assignment of this point under the
    perturbed model
    [PerturbWeightVec]=ComputeWeightVec( DataPoint,
    PerturbModel );

// determine if the assignments are the same. If so,
    update the correct
    // DSNew
    // component. If not, put the point in RSNew for l=1, . . . ,k
    {
    if ( TrueWeightVec(l)==1.0) and ( PerturbWeightVec
      (l)==1.0)
    {
      DSNew(l).Sum+=DataPoint;
      DSNew(l).Num++;
    }
    if ((TrueWeightVec(l)==1.0) and ( PerturbWeightVec
      (l)==0.0))
      or ((TrueWeightVec(l)==0.0) and
      ( PerturbWeightVec==1.0))
    {
      AddRS( DataPoint, RSNew );
    }
    }
  }
  return DSNew, RSNew;
}

[ New, RSNew]=WorstCaseAnalysis( DSs, RS, Model, ConfidenceLevel )
{
```

```
for (I=1; I<=Length(DSs); I++) {
  [DSsNew[I],RSNew]=
    WorstCaseAnalysis(DSs[I],RS,Models[I],
      ConfidenceLevel);
}
return DSsNew,RSNew;
}
```

Appendix B—Mahalanobis Threshold Analysis
Assume that the following functions are available:
1. [WeightVec]=ComputeWeightVec( DataPoint, Model): in the k-Mean case, returns the {0, 1} weight vector indicating the cluster to which DataPoint is assigned
2. AddRS( DataPoint, RS): appends singleton DataPoint to the end of RS, RS is increased by 1 point.
3. RSDistSort( RSDist ): sorts the list RSDistSort from smallest to greatest by the values in MahalDist.
4. [Dist]=DistanceMahalanobis( DataPoint, Center, CVDiagonal): computes the Mahalanobis distance from DataPoint to Center with the given covariance diagonal CVDiagonal.
5. [integer]=Floor(float): returns the integer obtained by rounding the float down to the nearest integer.
6. DSCopy(DSNew, DSOrig): copies DSOrig into DSNew, DSNew is altered, DSOrig remains the same.

The method:
```
[ DSsNew, RSNew]=Threshold( DSs, RS, Models, Percentage )
{
  // Percentage is the percentage of points to compress with
    this function
  DSCopy( DSNew, DS );
  RSNew=empty;
  Initialize(RSDist); // initialize the RSDist structure
  k=Length( Model );
  r=Length( RS );
  // Fill the fields of the RSDist structure
  For I=1, . . . ,K
  {
    Let Model=Models(I);
    For j=1, . . . ,r
    {
      DataPoint=RS(j).RSVec;
      [WeightVec]=ComputeWeightVec( DataPoint, Model
        );
      for l=1, . . . ,k
      {
        if ( WeightVec(l)==1.0 )
        {
          // DataPoint is assigned to cluster 1
          RSDist(j).ModelIndex=I;
          RSDist(j).RSIndex=j;
          RSDist(j).ClustAssign=l;
          RSDist(j).MahalDist=DistanceMahalanobis
            (DataPoint,
             Model(l).GetMean( ), Model(l).GetCVDiag( )
            );
        }
      }
    }
  }
  RSDistSort( RSDist ); // do the sorting // determine the number of points to compress
  CompressNum=Floor( r*Percentage);

For j=1, . . . ,r
  {
    DataPoint=RS(RSDist(j).RSIndex).RSVec;
    if (j<=CompressNum)
    {
      DSsNew(RSDist(j).ModelIndex,RSDist(j)
        .ClustAssign ).Sum+=
      DataPoint;
      DSsNew(RSDist(j).ModelIndex,RSDist(j)
        .ClustAssign)SumSq
      +=DataPoint*DataPoint;
      DSsNew(RSDist(j).ModelIndex, RSDist(j)
        .ClustAssign ).Num++;
    }
    else
    {
      AddRS( DataPoint, RSNew );
    }
  }
  return DSsNew, RSNew;
}
```

Appendix C SubCluster Data Set CS
We assume that the following functions are availale:
1. [Model]=VanillaKMean( Model, Data, StopTol ): takes initial values for Model and updates the model with the Data until the model ceases to changes, within StopTol. The updated model is returned in Model.
2. [CSMerged]=MergeCS( CSElem1, CSElem2 ): take the sufficient statistics for 2 sub-clusters, CS1 and CS2, and computes the sufficient statistics for the sub-cluster formed by merging CS1 and CS2.
3. AddRS( DataPoint, RS): appends singleton DataPoint to the end of RS, RS is increased by 1 point.
4. [SubModel]=RandomSample( RSNew, kPrime ): randomly chooses kPrime elements from RSNew and uses these as the initial points for the vanilla k-mean algorithm. The elements are stored in SubModel.
5. [WeightVec]=ComputeWeightVec( DataPoint, Model ): computes the {0, 1} weight vector with k elements. DataPoint is assigned to cluster j if the j-th element of the WeightVec is 1, the other elements are 0.
6. Append( integer, integerList ): appends the integer to the end of integerList.
7. RemoveCSCandidates( IndexList, CS ): removes the elements specified in IndexList from CS and returns the altered, smaller list in CS.
8. [BigCSList]=AppendCS( CSList1, CSList2 ): creates the BigCSList by appending CSList2 to the end of CSList1.
9. [SubcPartner,SubcPartnerInd]=FindMergePartner( Index, CS ): finds the element (subcluster) in CS that has center nearest to CS(Index) (a different subcluster) and returns this element in SubcPartner and its index.
10. AppendCSEnd( CS, CSElement ): appends CSElement to the end of the CS list
11. [CSIndex]=FindCSMatch(DataPoint,CS): finds the cluster in CS to which DataPoint is closest and, if DataPoint was merged into that cluster, the "density"

criteria would still be satisfied. If no such cluster exists, then this routine returns NULL.

12. [CSMergedElem]=MergeCS(DataPoint,CSElem): merges a singleton data point into a CS cluster and returns the merged Cluster.

The subclustering method:
[CSNew, RSNewer]=CSUpdate( CS, RSNew, StdTol, PointsPerSubClust, MinPoints, StopTol )
}

```
// STDTol is a scalar which defines the "dense" criteria
   discussed above
// a subcluster is deemed "dense" if the square root of the
   maximum element of
// its covariance matrix is less than StdTol
// PointPerSubClust is an integer which used to determine
   the number of
// secondary
// subclusters to search for in RSNew. The number of
   sub-cluster to search for is
// (# of points in RSNew)/(PointsPerSubClust)
// MinPoints is an integer specifying the minimum num-
   ber of points allowed in a
// subcluster. If a sub-cluster does not have have this
   number of points, the points
// remain as singletons are are placed in RSNewer.
// StopTol is a tolerance for the vanilla k-mean algorithm
//prefiltering
//filter as many points from rs into cs as possible now
r=length(RSNew);
for i=1, . . . ,r
{
   DataPoint=RSNew(i).RSVec;
   [WeightVec]=computeWeightVec(DataPoint,CS);
   for j=1, . . . , CS.NumElems
   {
      if (WeightVec(j)==1.0) {
         if (OkToMerge(DataPoint,CS(j))){
            CS(j)=Merge(DataPoint,CS(j));
            RSNew.Remove(i);
         }
      }
   }
}
CSCopy( CSNew, CS); // copy CS into CSNew
RSNewer=empty;

// determine the number of singleton data elements
r=length( RSNew );

// kPrime=the number of "dense" regions in RSNew to
   search for
kprime=floor( r/ PointsPerSubClust );

// choose the starting point for the vanilla k-Mean algo-
   rithm as kprime random
// elements
// of RSNew
[SubModel]=RandomSample( RSNew, kPrime );

// cluster these points and return the sub-clusters in
   CSCandidates
[CSCandidates]=VanillaKMean( SubModel, RSNew,
   StopTol );

// Filter out the candidates that have fewer than MinPoints
   and put the points
// generating
// these candidates into RSNewer
CSCandidateRemoveList=empty;
for l=1, . . . ,kPrime
{
   if (CSCandidates(l).Num<MinPoints)
   {
   // add the points in RSNew nearest to this sub-cluster
      center to
   RSNewer
   for j=1, . . . ,r
   {
      DataPoint=RSNew(j).RSVec;
      [WeightVec]=ComputeWeightVec( DataPoint,
         CSCandidates );
      if ( WeightVec(l)==1.0)
      {
      // this data point is in this sub-cluster
      AddRS( RSNewer, DataPoint );
      Append(l, CSCandidateRemoveList);
      }
   }
   }
}
// remove those candidates not having enough points in
   them
RemoveCS( CSCandidateRemoveList, CSCandidates );

kDoublePrime=length( CSCandidates );
CSCandidateRemoveList=empty;

// filter out the candidates that do not satisfy; the "dense"
   criteria
for l=1, . . . ,kDoublePrime
{
   CVDiag=CSCandidates(l).GetCVDiag( );
   // note that in the next line, sqrt is applied to all of the
      n elements of
   // CVDiag and
   // then the max is over this list of n elements
   If (max(sqrt(CVDiag))>StdTol)
   {
   // this sub-cluster's max standard deviation is too large
   Append(l, CSCandidateRemoveList );
   }
}
// remove those candidates satisfying this "dense" criteria
RemoveCS( CSCandidateRemoveList, CSCandidates );
[CSNew]=AppendCS(CS, CSCandidates);

// now consider merging the elements of CSNew
done=false;
CSIndex=1; // start with the first element of CSNew
while (not done)
{
```

```
// find the partner for CSIndex element of CSNew
[CSMergePartner,CSMergePartnerIndex]=
FindMergePartner(CSIndex,CSNew);
    // merge the two
    [CandMerge]=MergeCS( CSMergePartner, CSNew(
      CSIndex) );

// see if the merged sub-cluster still satisfies "density"
      criterion
    if( max( sqrt( CandMerge.GetCVDiag( ) ))<StdTol )
    {
    // the merged cluster is "dense" enough // remove CSNew(CSIndex) and CSMergePartner from
      list
    CSNewRemoveList=[ CSIndex, CSMergePartnerIn-
      dex ];
    RemoveCS( CSNewRemoveList, CSNew);

// append the merged cluster to the end of CSNew
    AppendCSEnd(CSNew, CandMerge);

// notice by doing the remove, the next sub-cluster to
      use
    // consider merging is CSNew( CSIndex ) so there is no
      need to
    // increment CSIndex }
    else
    {
    // the merged cluster is not "dense" enough
    // do nothing and increment CSIndex CSIndex++;
    }

// See if we've considered mergin all the sub-clusters
    if (CSIndex>length( CSNew ))
    {
    done=true;
    }
  }
  return CSNew, RSNewer;
}

Appendix D Stopping Criteria
Method 1
[Stop]=StoppingCrit1( OldModel, NewModel,
  PrevModelDiff, StopTol )
{
  // OldModel holds the model parameters (means, etc.)
    over calculated over the
  // last iteration
  // NewModel holds the model parameters over calculated
    over the current
  // iteration
  // PrevModelDiff is a vector of model deltas over the last
    (current-1), . . . ,(current
  // z)
  // iterations
  // StopTol is a scalar stopping tolerance
```

```
  k=length( OldModel );

// determine the model difference between OldModel and
    NewModel
  NewDiff=0.0;
  for l=1, . . . ,k
  {
    OldMean=OldModel(l).GetMean( );
    NewMean=NewModel(l).GetMean( );
    NewDiff +=Distance2Norm( OldMean, NewMean );
  }
  NewDiff=(NewDiff/k);

If ( max( [PrevModelDiff, NewDiff])<StopTol )
  {
    Stop=true;
  }
  else
  {
    Stop=false;
  }
  return Stop;
{
Method 2
Stopping criteria 2 requires the following function which
computes the "Energy" of a given Model given the sets DS,
CS and RS:
[Energy]=EnergyFunctionKMean( Model, DS, CS, RS )
}
  k=length( Model );
  c=length( CS );
  r=length( RS );
  Energy=0.0;

// compute energy over the set RS
  for j=1, . . . ,r
  {
    DataPoint=RS(j).RSVec;
    [WeightVec]=ComputeWeightVec( DataPoint, Model
    );
    for l=1, . . . ,k
    {
    if (WeightVec(l)==1.0)
    {
      Energy+=
      Distance2Norm(DataPoint,Model(l).GetMean( ));
    }
    }
  }
  // compute energy over the set CS
  CSPoints=0; // count the number of data points summa-
    rized by CS
  For j=1, . . . ,c
  {
    CSCenter CS(j).GetMean( );
    CSPoints +=CS(j).GetNum;
    [WeightVec]=ComputeWeightVec( CSCenter, Model );
    for l=1, . . . ,k
    {
```

```
    if (WeightVec(l)==1.0)
    {
      Energy +=CS(j).GetNum( )*
      Distance2Norm(CSCenter, Model(l).GetMean( ));
    }
  }
}
// compute the energy over DS
DSPoints=0; // count the number of points summarized by DS
For l=1, . . . ,k
{
  DSCenter=DS(l).GetMean( );
  DSPoints +=DS(l).GetNum( );
  Energy +=DS(l).GetNum*Distance2Norm(DSCenter,
    Model(l).GetMean( ));
}
Energy=(1/(r+CSNum+DSNum))*Energy;
Return Energy;
}
The method:
[Stop]=StoppingCrit2( OldModel, NewModel, DSOld,
  DSNew, CSOld, CSNew, RSOld, RSNew,
  PrevEnergyDiff, StopTol )
{
  // OldModel holds the model parameters (means, etc.)
    calculated over the
  // last iteration
  // NewModel holds the model parameters over calculated
    over the current
  // iteration
  // PrevEnergyDiff is a vector of energy deltas over the last
    (current-1), . . . ,(current-z)
  // iterations
  // StopTol is a scalar stopping tolerance // determine the difference in energy between the new and
old models
  NewEnergy=EnergyFunctionKMean( NewModel,
    DSNew, CSNew, RSNew );
  OldEnergy=EnergyFunctionKMean( OldModel, DSOld,
    CSOld, RSOld );
  NewDiff=abs(NewEnergy-OldEnergy);

If ( max( [PrevModelDiff, NewDiff])<StopTol )
  {
  Stop=true;
  }
  else
  {
    Stop=false;
  }
  return Stop;
}
```

Appendix E Multiple Model Updating

The following methods are assumed to be available to the clustering driver:

1. UpdateModel (Model,RSNode,WeightVec): updates Model with singleton data point RSNode using weighting information specified in WeightVec.
2. UpdateModel (Model,CSNode,WeightVec): updates Model with compressed set node CSNode using weighting information specified in WeightVec.
3. UpdateModel(Model,DSNode,WeightVec): updates Model with discard set node using weighting information specified in WeightVec.
4. ReinitializeEmptyCluster(ModelNode,DSs,CS,RS): reinitializes an empty cluster ModelNode, using information in DSs, CS and RS. Currently empty clusters are reinitialized using the RS and CS nodes which are most unprobable w.r.t. to their most probable clusters. However, many other heuristics are possible.

The method:

```
[ModelsNew]=Update_Models (Models,DSs,CS,RS,
  stopTol)
  r=Length(RS);
  c=Length(CS);

for (iModel=1; iModel<Length(Models); iModel++) {

// Determine number of clusters.
    Let Model=Models[iModel];
    K=Length(Model);

// Perform Extended Update algorithm.
    do {
    // Initialize ModelTemp to zeros.
    Zero(ModelTemp);

// Update ModelTemp over RS.
    for (i=1; i <=r; i++) {
      [WeightVec]=computeWeightVec(RS(i).RSVec,
        Model);
      UpdateModel(ModelTemp,RS(i),WeightVec);
    }

// Update ModelTemp over CS.
    for (i=1; i <=r; i++) {
      [WeightVec]=computeWeightVec(CS(i).GetMean(
        ));
      UpdateModel(ModelTemp,WeightVec);
    }

// Update ModelTemp over DSs.
    for (i=1; i <=Length(DS); i++) {
      Let DS=DSs(i)
      for (j=1; j <=Length(DS); j++) {
        [WeightVec]=computeWeightVec(DS(j),Model);
        UpdateModel(ModelTemp,DS(j),WeightVec);
      }
    }
    // Re-initialize ModelTemp
    if (ReinitializeEmptyClusters) {
      for (i=1; i <=K; i++) {
        if (ModelTemp(i).GetCount( )==0) {
          ReinitializeEmptyCluster(ModelTemp(i),DSs,
            CS
            ,RS);
        }
      }

[Diff]=ModelDiff(Model,ModelTemp);
      □

} while (Diff>StopTol);
```

```
        □

□

[Model]=ModelCopy(ModelTemp);
        □

}
    □
    return [Models]
}
```

Appendix E Scaleable Clustering Driver Method
The following methods are assumed to be available to the clustering driver:
1. [dataSource]=Open_DataSource(dataSourceName, scanType): opens up a connection to the given data source, from which all data points will be consumed.
2. [RS,numRowsRead]=DataSource_getNextRows (dataSource,maxRSRows): retrieves up to maxRSRows from dataSource, using the appropriate scan type.
3. [ModelsNew]=ModelsUpdate(Models,DSs,CS,RS, stopTol): see above description of ModelsUpdate.
4. [DSsNew,RSNew]=DSsUpdate(DSs,RS,ModelsNew, Confidence): performs primary data compression on RS, see above description.
5. [CSNew,RSNewer]=CSUpdate(CS,RSNew,StdTol, PointsPerSubClust, MinPoint, StopTol): performs secondary compression on RS, see above description.
6. [Stop]=StopCriteria (Models,DSs,CS,RS,OldEnergy, PrevDiff, ModelsNew,DSsNew,CSNew,RSNewer, StopTol): performs stop criteria check, see above description.
7. Close_DataSource(dataSource): closes connection to data source.

The method:
```
[Models]=Cluster ( )
    // Initialize all of the models . . .
    for (iModel=1; iModel<numModels; iModel++) {
        InitializeModel (Models[iModel]);
        Zero(DSs[iModel]);
        PrevDiffs[iModel]=0;
        Stop[iModel]=0;
        OldEnergy[iModel]=0;

}

// Connect to the data source . . .
    [dataSource]Open_DataSource(dataSourceName);

do {
        // Fill up RS to specified maximum level.
        [RS,numRowsRead]=datasrc_getNextRows
            (dataSource,maxRSRows);
        if (numRowsRead==0)
        break;

// Update Models, DSs, CS and RS.
        [ModelsNew]=ModelsUpdate(Models,DSs,CS,RS,
            stopTol);
        [DSsNew,RSNew]=DSUpdate(DSs,RS,ModelsNew,
            Confidence);
        [CSNew,RSNewer]=
            CSUpdate(CS,RSNew,StdTol,PointsPerSubClust,
            MinPoint,StopTol);

// Perform Stop Criteria check.
        [Stop]=StopCriteria (Models,DSs,CS,RS,OldEnergy,
            PrevDiff,
            ModelsNew,DSsNew,CSNew,RSNewer,StopTol);

// Copy new values.
        [Models]=[ModelsNew];
        [DSs]=[DSsNew];
        [CS]=[CSNew];
        [RS]=[RSNewer];
    } while (!Stop);

Close_DataSource(dataSource);
    return [Models];

}
```

What is claimed is:

1. A method for clustering data in a database that is stored on a storage medium comprising the steps of:
   a) obtaining a portion of the data in the database from a storage medium;
   b) clustering data from the portion of data obtained from the database based upon a clustering criteria to produce a clustering model;
   c) compressing at least some of the data contained within the portion of data by evaluating a data compression criteria based on the clustering model and producing sufficient statistics for the data satisfying the compression criteria;
   d) storing the sufficient statistics for the data satisfying the compression criteria separate from the clustering model for use in subsequent refinement of said clustering model;
   e) continuing to obtain portions of data from the database and refining the clustering model that characterizes data in the database from newly sampled data and the stored sufficient statistics for the data satisfying the compression criteria until a specified stopping criteria has been satisfied; and
   f) displaying progress of the characterization of the clustering of the database on a user interface and providing a user controller input for stopping or suspending further building of a database clustering model.

2. The method of claim 1 wherein the displaying step comprises the step of displaying a user interface for allowing a user to suspend and resume the clustering.

3. The method of claim 1 additionally comprising the step of providing a user interface wherein the user can adjust parameters of the clustering analysis.

4. The method of claim 3 wherein the parameters include a stopping criteria.

5. A computer readable medium having stored thereon a data structure, comprising:
   a) a first data portion containing a model representation of data stored on a database wherein the model representation includes multiple clusters defined by a vector containing a summation of data records from the database having vector components corresponding to attributes of said data records;

b) a second data portion containing sufficient statistics of a portion of the data in the database which summarizes multiple clusters defined by a vector containing a summation of summarized data records from the database having vector components which are attributes of said data records;

c) a third data portion containing individual data records obtained from the database for use with the sufficient statistics to determine said model representation contained in the first data portion; and d) wherein said sufficient statistics from the second data portion and said individual data records from the third data portion each contribute to said model representation contained in said first data portion.

6. The data structure of claim 5 wherein the second data portion includes a first subportion that is organized in accordance with data clusters which characterize the database and a second subportion which is not organized according to cluster.

7. The data structure of claim 5 wherein the data associated with a data cluster includes the number of data records from the database associated with said cluster.

8. In a computer data mining system, apparatus for evaluating data in a database comprising:

a) one or more data storage devices for storing a database of records on a storage medium;

b) a computer having an interface to the data storage devices for reading data from the storage medium and a computer rapid access memory for storing data during subsequent data clustering evaluation; and c) said computer comprising a processing unit for evaluating at least some of the data in the database and for characterizing the data into multiple numbers of data clusters; said processing unit programmed to retrieve a subset of data from the database into the rapid access memory, evaluate the subset of data to produce a clustering model that characterizes the database using a clustering criteria, compressing at least some of the retrieved data by summarizing and storing the data in a compressed form separate from the clustering model for use in subsequent refinement of the clustering model and retrieve additional data from the database to update the clustering model based on the summarization of the previously retrieved data and the newly retrieved additional data.

9. The apparatus of claim 8 wherein the processing unit further comprises means to iteratively bring data from the database and update the characterization of data into clusters until a specified criteria has been reached.

10. The apparatus of claim 8 additionally comprising a video monitor to depict a user interface which updates a user regarding a status of the classification of data and including a command input for allowing a user to suspend or to stop the process.

11. The apparatus of claim 10 wherein the computer presents a user interface on the video monitor for allowing a user to adjust parameters of the clustering process.

12. The apparatus of claim 11 wherein the user interface allows a user to adjust a depiction or organization of data from the database based upon a cluster number to which data is assigned during a clustering process.

13. The apparatus of claim 8 wherein the computer updates multiple clustering models and includes multiple processors for updating said multiple clustering models.

14. In a computer data mining system, a method for evaluating data in a database that is stored on a storage medium to produce multiple clustering models in one scan of the database or less comprising the steps of:

a) initializing multiple storage areas for storing multiple cluster models of the data in the database;

b) obtaining a portion of the data in the database from a storage medium;

c) using a clustering criteria to characterize a clustering of data from the portion of data obtained from the database for each model;

d) compressing at least some of the data contained within the portion of data based upon a compression criteria to produce for storage separate from the clustering models sufficient statistics for the data satisfying the compression criteria for use in refining the clustering models; and e) continuing to obtain portions of data from the database and characterizing the clustering of data in the database from newly sampled data and the stored sufficient statistics for each of the multiple cluster models until a specified clustering criteria has been satisfied for one or more of the multiple cluster models.

15. The method of claim 14 wherein a portion of the sufficient statistics is unique for each of the clustering models and wherein a portion of the sufficient statistics is shared between different clustering models.

16. The method of claim 14 wherein the specified criteria is reached when iterative solutions for one of the models does not vary by more that a predetermined amount.

17. The method of claim 14 wherein the specified criteria is reached when iterative solutions for a specified number of the models do not vary by more that a predetermined amount.

18. The method of claim 14 wherein the multiple models are generating from multiple different starting conditions.

19. The method of claim 18 wherein at least some of the models have different numbers of clusters.

20. The method of claim 14 wherein multiple clustering models are generated in an inner processing loop and wherein an outer processing loop iterates over different values of cluster number.

* * * * *